US010171940B1

(12) United States Patent
Greenberger et al.

(10) Patent No.: US 10,171,940 B1
(45) Date of Patent: Jan. 1, 2019

(54) TRANSPORTATION ACTIVATED GEOFENCE

(71) Applicant: INTERNATIONAL BUSINESS MACHINES CORPORATION, Armonk, NY (US)

(72) Inventors: Jeremy A. Greenberger, Raleigh, NC (US); Liang Wen, Huntington Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/698,064

(22) Filed: Sep. 7, 2017

(51) Int. Cl.
| | |
|---|---|
| *H04W 24/00* | (2009.01) |
| *H04W 4/021* | (2018.01) |
| *H04W 4/02* | (2018.01) |
| *H04W 4/18* | (2009.01) |
| *H04W 64/00* | (2009.01) |

(Continued)

(52) U.S. Cl.
CPC .......... *H04W 4/021* (2013.01); *G01S 5/0027* (2013.01); *H04L 67/18* (2013.01); *H04L 67/306* (2013.01); *H04W 4/026* (2013.01); *H04W 4/027* (2013.01); *H04W 4/18* (2013.01); *H04W 64/006* (2013.01)

(58) Field of Classification Search
CPC ....... H04W 64/00; H04W 4/02; H04W 4/021; H04W 4/023; H04W 4/025; H04W 4/026; H04W 4/027; H04W 4/028
USPC ......... 455/456.1, 456.2, 456.3, 456.5, 456.6, 455/457
See application file for complete search history.

(56) References Cited

U.S. PATENT DOCUMENTS

| | | |
|---|---|---|
| 7,343,317 B2 | 3/2008 | Jokinen et al. |
| 7,912,630 B2 | 3/2011 | Alewine et al. |
| 8,812,027 B2 | 8/2014 | Obermeyer et al. |

(Continued)

FOREIGN PATENT DOCUMENTS

| | | |
|---|---|---|
| CN | 1460373 | 12/2003 |
| WO | 2012135155 | 10/2012 |

OTHER PUBLICATIONS

Bareth, Ulrich et al.; geoXmart—A Marketplace for Geofence-Based Mobile Services; 2010 34th Annual IEEE Computer Software and Applications Conference; Jul. 19-23, 2010; pp. 101-106.

(Continued)

*Primary Examiner* — Temica M Beamer
(74) *Attorney, Agent, or Firm* — Schmeiser, Olsen & Watts; Isaac J. Gooshaw

(57) ABSTRACT

Systems, methods and tools for a geofence creator to select a specific mode of transportation during the geofence creation process to target a specific subset of customers. The geofence creator may select geofence properties during the creation, including size, location, mode of transportation and a message displayed to active users entering the geofence under the correct mode of transportation. The geofence system use different mechanisms for identifying the mode of transportation being utilized by the user of a client device. The client device may include hardware or software measuring devices or sensors capable of identifying the location of the user, the rate of change in the user's location, changes in the user's position, the acceleration of the user and/or the velocity of the user. If the correct mode of transportation is identified when the user enters the location of the geofence, the message will be displayed, otherwise no message may display on the user's client device.

14 Claims, 14 Drawing Sheets

(51) Int. Cl.
  *H04L 29/08* (2006.01)
  *G01S 5/00* (2006.01)

(56) References Cited

U.S. PATENT DOCUMENTS

| | | |
|---|---|---|
| 9,043,329 B1 | 5/2015 | Patton et al. |
| 9,060,248 B1 | 6/2015 | Coulombe et al. |
| 9,100,795 B2 | 8/2015 | Sartipi et al. |
| 9,194,955 B1 | 11/2015 | Fahrner et al. |
| 9,226,105 B2 | 12/2015 | Turgman et al. |
| 9,363,221 B1 | 6/2016 | Ozog |
| 9,736,636 B1 | 8/2017 | Deluca et al. |
| 9,756,607 B1 | 9/2017 | Deluca |
| 9,820,097 B1 | 11/2017 | Deluca et al. |
| 9,924,315 B1 | 3/2018 | Cornwall et al. |
| 2008/0139181 A1 | 6/2008 | Lokshin |
| 2008/0248815 A1 | 10/2008 | Busch |
| 2008/0312946 A1 | 12/2008 | Valentine et al. |
| 2009/0164118 A1 | 6/2009 | Breen |
| 2009/0197582 A1 | 8/2009 | Lewis et al. |
| 2009/0258636 A1 | 10/2009 | Helvick |
| 2010/0161207 A1 | 6/2010 | Do |
| 2011/0093339 A1 | 4/2011 | Morton |
| 2011/0314144 A1 | 12/2011 | Goodman |
| 2011/0320259 A1 | 12/2011 | Roumeliotis et al. |
| 2012/0054028 A1 | 3/2012 | Tengler et al. |
| 2012/0271715 A1 | 10/2012 | Morton et al. |
| 2012/0310741 A1 | 12/2012 | Uyeki et al. |
| 2013/0030931 A1 | 1/2013 | Moshfeghi |
| 2013/0045760 A1 | 2/2013 | Obermeyer et al. |
| 2013/0267253 A1 | 10/2013 | Case et al. |
| 2013/0326137 A1 | 12/2013 | Bilange et al. |
| 2013/0332274 A1 | 12/2013 | Faith et al. |
| 2014/0057648 A1 | 2/2014 | Lyman et al. |
| 2014/0155094 A1 | 6/2014 | Zises |
| 2014/0162692 A1 | 6/2014 | Li et al. |
| 2014/0164118 A1 | 6/2014 | Polachi |
| 2014/0279015 A1 | 9/2014 | Root et al. |
| 2014/0337123 A1 | 11/2014 | Nuernberg et al. |
| 2014/0379430 A1 | 12/2014 | Kritt et al. |
| 2015/0011237 A1 | 1/2015 | Obermeyer et al. |
| 2015/0099461 A1 | 4/2015 | Holden et al. |
| 2015/0120453 A1 | 4/2015 | Lee et al. |
| 2015/0163626 A1* | 6/2015 | Zimmer .................. H04W 4/90 455/404.2 |
| 2015/0199704 A1 | 7/2015 | Gottesman et al. |
| 2015/0220993 A1 | 8/2015 | Bente |
| 2015/0237470 A1* | 8/2015 | Mayor .................. H04W 4/021 455/456.2 |
| 2015/0269167 A1 | 9/2015 | Tseng |
| 2015/0269624 A1 | 9/2015 | Cheng et al. |
| 2015/0271638 A1 | 9/2015 | Menayas et al. |
| 2015/0271639 A1 | 9/2015 | Ziskind et al. |
| 2015/0281889 A1* | 10/2015 | Menendez ............ H04W 4/021 455/456.1 |
| 2015/0341747 A1 | 11/2015 | Barrand et al. |
| 2015/0355893 A1 | 12/2015 | Luk et al. |
| 2015/0365796 A1 | 12/2015 | Toni |
| 2016/0007151 A1 | 1/2016 | Birch et al. |
| 2016/0034961 A1 | 2/2016 | May et al. |
| 2016/0057573 A1 | 2/2016 | Chang et al. |
| 2016/0057576 A1 | 2/2016 | Kessler et al. |
| 2016/0061609 A1 | 3/2016 | Dickey et al. |
| 2016/0066141 A1 | 3/2016 | Jain et al. |
| 2016/0080486 A1 | 3/2016 | Ram et al. |
| 2016/0183052 A1 | 6/2016 | Qiu |
| 2016/0253710 A1 | 9/2016 | Publicover et al. |
| 2017/0019761 A1 | 1/2017 | Heo |
| 2017/0289754 A1* | 10/2017 | Anderson ............... H04W 4/04 |
| 2018/0091940 A1* | 3/2018 | Gonzalez ........... G01C 21/3679 |
| 2018/0121957 A1 | 5/2018 | Cornwall et al. |
| 2018/0121958 A1* | 5/2018 | Aist ................... G06Q 30/0261 |

OTHER PUBLICATIONS

Friedman, Jack P.; List of IBM Patents or Patent Applications Treated as Related; Sep. 7, 2017; 1 page.
Levent Besik and Alessio Pace, Systems and Methods of Managing Geofences, Technical Disclosure Commons, Apr. 22, 2016, pp. 10.
Chu, Hon et al.; I am a Smartphone and I Know My User is Driving; 2014 Sixth International Conference on Communication Systems and Networks (COMSNETS); Jan. 6-10, 2014; 8 pages
Roy, Nirupam et al.; I am a Smartphone and I can Tell my User's Walking Direction; Proceedings of the 12th Annual International conference on Mobile Systems, Applications and Services; Jun. 16-19, 2014; pp. 329-342.
Ahmed, Nasimuddim et al.; SmartEvacTrak: a People Counting and Coarse-Level Localization Solution for Efficient Evacuation of Large Buildings; 2015 IEEE International Conference on Pervasive Computing and Communication Workshops (PerCom Workshops); Mar. 23-27, 2015; pp. 372-377.
Zin, M.S.I.M et al.; Development of Auto-Notification Application for Mobile Device using Geofencing Technique; Journal of Telecommunication, Electronic and Computer Engineering (JTEC) vol. 7, No. 2, Jul.-Dec. 2015, pp. 169-173.
Friedman, Jack P.; List of IBM Patents or Patent Applications Treated as Related; Oct. 4, 2017; 1 page.
Hendrix, Phil, Dr.; Watch this Space—How Mobile and Beacons Are Enhancing the Value of Out-of-Home Media for Advertisers and Mobile App Partners; A whitpaper sponsored by Gimbal; Aug. 2015; 23 pages.
Mell, Peter et al.; The NIST Definition of Cloud Computing; National Institute of Standards and Technology; Special Publication 800-145; Sep. 2011; 7 pages.
Neilsen Norman Group; Evidence-Based user Experience Research, Training and Consulting; https://www.nngroup.com; retrieved from the Internet Sep. 28, 2017; 5 pages.
Ruckus Wireless; Location: The New Battlefield for Business & Digital Innovation; www.ruckuswireless.com; 2014; 9 pages.

* cited by examiner

TRANSPORTATION ACTIVATED GEOFENCE

TECHNICAL FIELD

The present disclosure relates generally to systems, methods and tools for creating, using and displaying geofences.

BACKGROUND

As portable devices, such as mobile communication systems, smart phones, tablet computers, laptops and navigation devices, become more advanced and powerful, these portable devices increasingly provide locational guidance to users in real time. More recently, portable devices have introduced a concept known as geo-fencing. A geofence is a virtual perimeter around a real-world location. Portable devices that implement geo-fencing functionalities may alert the user when the portable device has entered or exited an established geofence.

A geofence's perimeter may be virtually established around a point of interest such as an address, a store, or a home. Programs that incorporate geo-fencing allow an administrator of a geofence to set up triggers so when a device enters (or exits) the boundaries of the geofence (defined by the administrator), a push notification, text message or email alert may be sent. Many geo-fencing applications incorporate Google® Earth, allowing administrators to define boundaries on top of a satellite view of a specific geographical area. Other applications may define boundaries by longitude and latitude or through user-created and Web-based maps.

SUMMARY

A first embodiment of the present disclosure provides a method for targeting geofence messages based on a transportation mode of a user comprising the steps of: creating, by a processor of a computer system, a geofence, wherein the geofence comprises a location, size, message and mode of transportation parameters; receiving, by the processor, location data of a client device operated by the user; further receiving, by the processor, measurements from a measuring device or a sensor quantifying movement of the client device; analyzing, by the processor, a rate of change in the location data and the measurements from the measuring device or sensor to identify the transportation mode as a function of the location data and measurement; concluding, by the processor, that a location of the client device is within the location of the geofence and that the transportation mode of the user operating the client device is the same as the mode of transportation parameter defined by the geofence as a function of the measurements and location data; and displaying, by the processor, the message on the client device.

A second embodiment of the present disclosure provides a computer system, comprising: a processing unit; a memory device coupled to the processing unit; a measuring device or sensor; and a computer readable storage device coupled to the processor, wherein the storage device contains program code executable by the processing unit via the memory device to implement a method for targeting a geofence messages based on a transportation mode of a user comprising the steps of: creating, by the processing unit, a geofence, wherein the geofence comprises a location, size, message and mode of transportation parameters; receiving, by the processing unit, location data of a client device; further receiving, by the processing unit, measurements from the measuring device or the sensor quantifying movement of the client device; analyzing, by the processing unit, a rate of change in the location data and the measurements from the measuring device or the sensor to identify the transportation mode of the client device, as a function of the location data and measurement; concluding, by the processing unit, that a location of the client device is within the location of the geofence and that the transportation mode of the user operating the client device is the same as the mode of transportation parameter defined by the geofence as a function of the measurements and location data; and displaying, by the processing unit, the message on the client device.

A third embodiment of the present disclosure provides a computer program product comprising: one or more computer readable hardware storage devices having computer readable program code stored therein, said program code containing instructions executable by the one or more central processing units (CPU) to implement a method for targeting geofence messages based on a transportation mode of a user comprising the steps of: creating, by the CPU, a geofence, wherein the geofence comprises a location, size, message and mode of transportation parameters; receiving, by the CPU, location data of a client device; further receiving, by the CPU, measurements from the measuring device or the sensor quantifying movement of the client device; analyzing, by the CPU, a rate of change in the location data and the measurements from the measuring device or the sensor to identify the transportation mode of the client device, as a function of the location data and measurement; concluding, by the CPU, that a location of the client device is within the location of the geofence and that the transportation mode of the user operating the client device is the same as the mode of transportation parameter defined by the geofence as a function of the measurements and location data; and displaying, by the CPU, the message on the client device.

DETAILED DESCRIPTION

Overview

Figure 1:
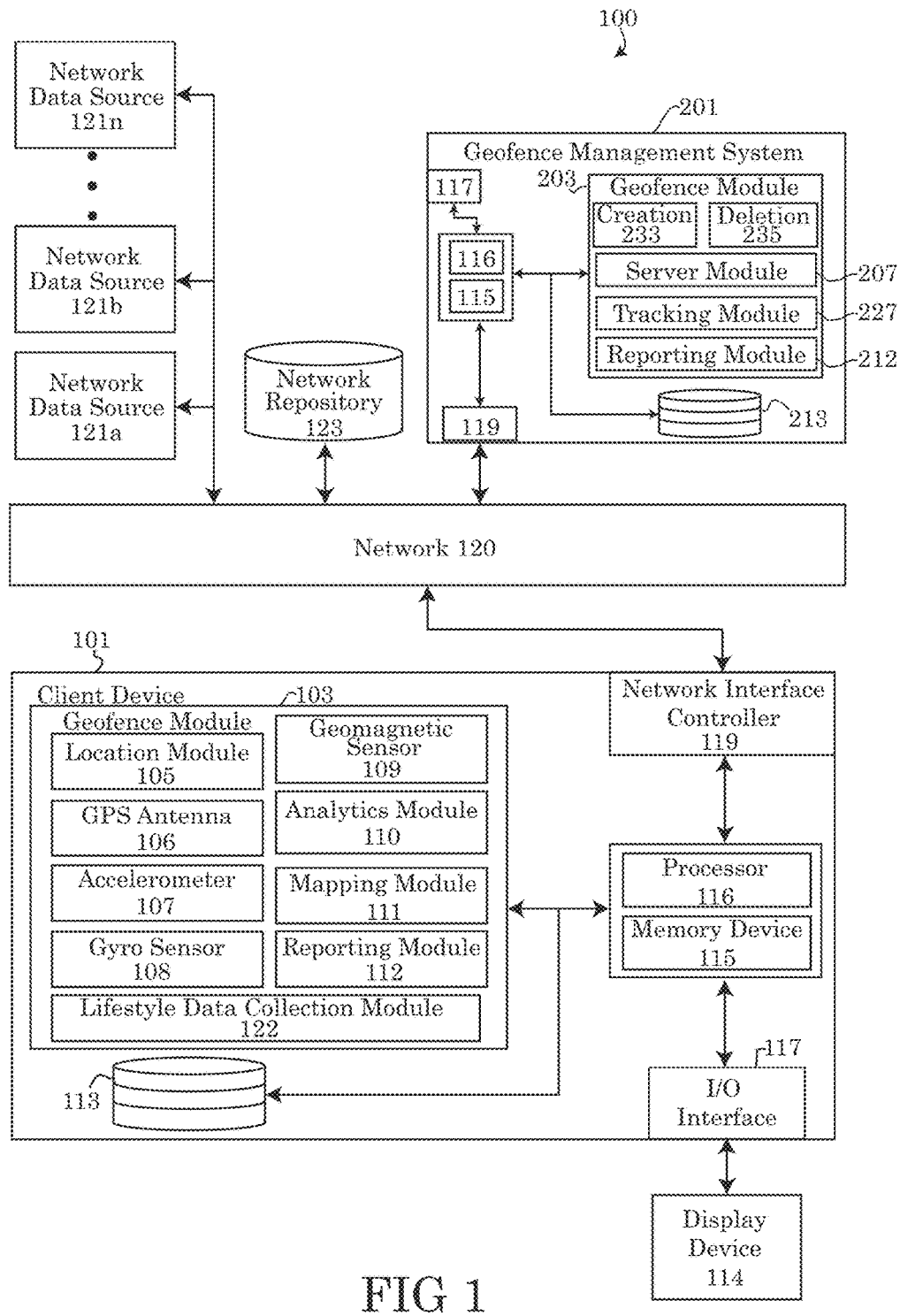
FIG. 1 depicts a schematic view of an embodiment of a system for targeting geofence messages based on the transportation mode of a user consistent with the embodiments of the present disclosure.

It is beneficial to marketers and marketing departments to organize their marketing strategy to target specific clients. Marketers use geofences to market and advertise goods, services, products, and special events to their customers directly. One desirable feature for marketing campaigns may be the ability for geofencing programs to target client devices of users that that are within a specific walking distance, biking distance, or even driving distance from the geofences the marketers create. However, even if a particular transportation mode is designated when a geofence is created, it may difficult to determine the distances that should be considered walking, biking or driving distances. Various users perceive the different distances as being desirable for different modes of transportation. For example, a user that may be young, fit and/or active may consider distances greater than a mile or greater than two miles to be easily destinations within walking distance. Whereas, another user that may be out of shape or may be unable to consider distances over a mile or two as walking distance. Thus, a system and method may be needed to dynamically determine the various transportation modes being used by each individual users in order to correctly trigger geofences intended for users actively traveling using a designated transportation mode set within the parameters of a geofence during creation.

Embodiments of the present disclosure recognize that currently available geofence systems, methods and tools lack the ability to target geofence messages to customers based on the transportation mode of the user using the client device triggering each geofence. Embodiments of the geofence systems and methods of the present disclosure are able to target geofence campaign messages based on current transportation mode of the user in order to attract users within short walking distances, medium bicycling distances or further driving distances, as desired by the geofence creator.

Embodiments of the geofence systems, methods and tools of the present application allow for a geofence creator to select a specific mode of transportation during the geofence creation process in order to target a specific subset of customers that may trigger the messages of the geofences. For example, in some embodiments, transportation modes that may be selected during the creation of the geofence may include walking, bicycling or driving. The geofence creator may also select other geofence properties during the creation, including size, location, and message that may be displayed by active users entering the geofence under the correct mode of transportation.

Embodiments of the geofence system, methods and tools may implement a plurality of different means for identifying the mode of transportation being utilized by the user of a client device when the user (and client device) enter the geofence. In some embodiments, the client device may include hardware or software measuring devices or sensors capable of identifying the location of the user, the rate of change in the user's location, changes in the user's position, the acceleration of the user and/or the velocity of the user. For example, the client device may be equipped with specialized pieces of hardware such as a GPS antenna, accelerometer, gyroscope sensor, geomagnetic sensor, WiFi antenna or any other device capable of measuring the position or change in position of the client device and the user operating the client device.

In alternative embodiments, a user's client device may comprise software capable of performing the functions of a sensor or measuring device. Moreover, in additional embodiments, the hardware and/or software components used for measuring the physical forces on the user or changes in the user's location may be incorporated into separate hardware devices and communicate with the user's client device by establishing a network between the client device and the separate hardware. For instance, a user may have a workout band that tracks the movement of the user, which may be equipped with a measuring device or sensors. The client device may be capable of communicating with the separate hardware device via a wireless communication protocol such as Bluetooth or WiFi or via an API.

Embodiments of the systems methods and tools may also use the data collected by the measuring devices and sensors to draw conclusions about the mode of transportation being used by the user of the client device. Moreover, in some embodiments, one or more systems may collect additional user information (referred to as "lifestyle data") to further assist with identifying the mode of transportation being utilized or to verify the conclusions drawn by the system based on the measuring device or sensors would be considered accurate. In some embodiments, the geofence systems may access one or more network accessible data sources and download data about the user and apply the data to an analytical model. For example, the geofence systems may collect lifestyle data from the user's calendar, email systems, exercise applications, social media, direct messaging applications, SMS text applications, movement history and recent travel patterns of the user, current weather applications, the time of day, and recent modes of travel by the user within the area where the geofence of interest has been created.

The systems may cross reference the location data with user data and/or lifestyle data collected by the system to identify the transportation mode being utilized by the user as the user enters, exits or dwells within an active geofence. If the transportation mode of the user matches the more of transportation setting established by the geofence's parameters, the message of the geofence may be displayed on the user's client device. Otherwise, if the current transportation mode of the user and the mode of transportation parameter do not match when the user enters, exits or dwells within a geofence, a geofence message is not displayed on the user's client device.

System for Tageting Geofences to Modes of Transportation

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIG. 1 depicts a block diagram of a geofence system 100 capable of targeting geofence messages based on a transportation mode of a user accessing the geofence, via a client device 101 connected to the geofence system 100. Client device 101 may be herein referred to as computing systems 101 and/or as specialized computing systems 101. Geofence management system 201 may be herein referred to as computing system 201 and/or as specialized computing system 201. Embodiments of the geofence system 100 may include a plurality of one or more computer systems 101, 201 including one or more client devices 101, geofence management systems 201 and network accessible data sources 121a, 121b . . . 121n (collectively referred to as "network data source 121) which may be hosted by one or more computer systems or servers. The number of client devices 101, network accessible data sources 121 or geofence management systems 201 may not be limited to the number of devices depicted in the drawings. The number of client devices 101, geofence management systems 201 and network accessible data sources 121 may be any number of computer systems that may be supported by network 120.

Figure 14:
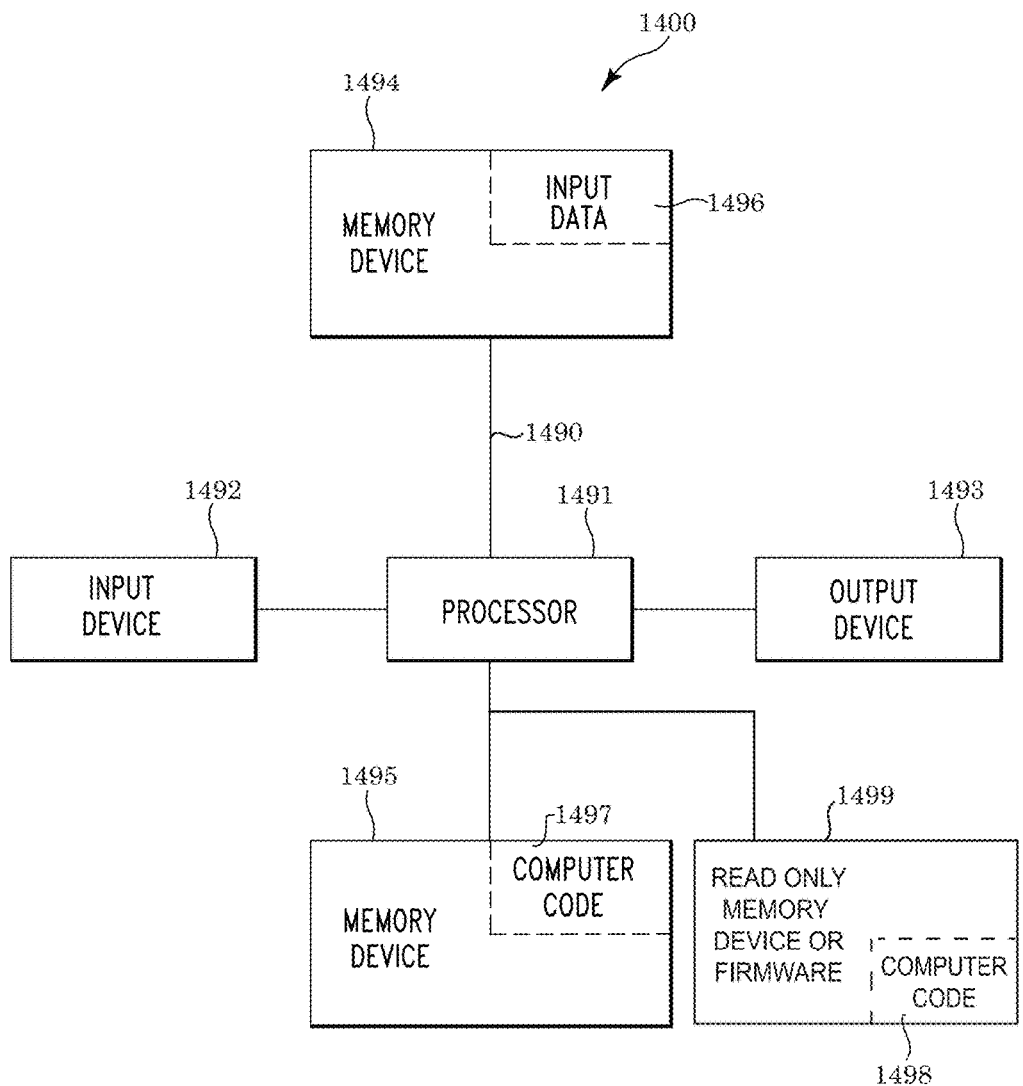
FIG. 14 depicts an embodiment of a computing system consistent with the computer systems of the present disclosure.

Each of the computer systems 101, 201, systems providing the network accessible data sources 121 and the network accessible hardware (such as network repository 123) connected to the network 120 of the geofence system 100 may each be a specialized computer systems comprising specialized configurations of hardware, software or a combination thereof as depicted in FIGS. 1-12 of the present disclosure and in the embodiments described herein. Embodiments of each of the computer systems connected to the geofence system 100 may not only comprise the elements of the systems and devices depicted in FIG. 1-12, but may also incorporate one or more elements of a generic computer system 1400 as shown in FIG. 14 and as described in the COMPUTER SYSTEM section detailed below. One or more elements of the generic computer system 1400 of FIG. 14 may be integrated into the specialized computer systems of the client device 101 or geofence management system 201 of FIGS. 1-12.

Each of the computer systems 101, 201, systems delivering the network data source 121, and the network accessible hardware such as the network repository 123, may each be connected and placed in communication with one another over the computer network 120. Embodiments of the network 120 may be constructed using wired or wireless connections between each hardware device connected to the network 120. As shown in the exemplary embodiments, each of the computer systems 101, 201 may connect to the network 120 and communicate over the network 120 using a network interface controller (NIC) 119 or other network communication hardware. Embodiments of the NIC 119 may implement specialized electronic circuitry allowing for communication using a specific physical layer and a data link layer standard. For example Ethernet, Fiber channel, Wi-Fi or Token Ring.

The NIC 119 may further allow for a full network protocol stack, enabling communication over network 120 to the group of computer systems or other computing hardware devices linked together through communication channels. Embodiments of the network 120 may facilitate communication and resource sharing among the computer systems 101, 201 and the additional hardware devices connected to the network 120, for example a network accessible repository 123. Examples of network 120 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

In some embodiments, the network may be a cloud computing environment 50. Cloud computing is a model of service delivery enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. The characteristics of the cloud computing model may be described as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models under a cloud computing environment may be described as follows:

Software as a Service (SaaS): the capability provided to the consumer is to use the provider's applications running on a cloud infrastructure. The applications are accessible from various client devices 54A, 54B, 54C ... 54N through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models of cloud computing environments may be described as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment may be service oriented with a focus on statelessness, low coupling, modularity, and semantic interoperability. At the heart of cloud computing is an infrastructure that includes a network of interconnected nodes 110.

Figure 3:
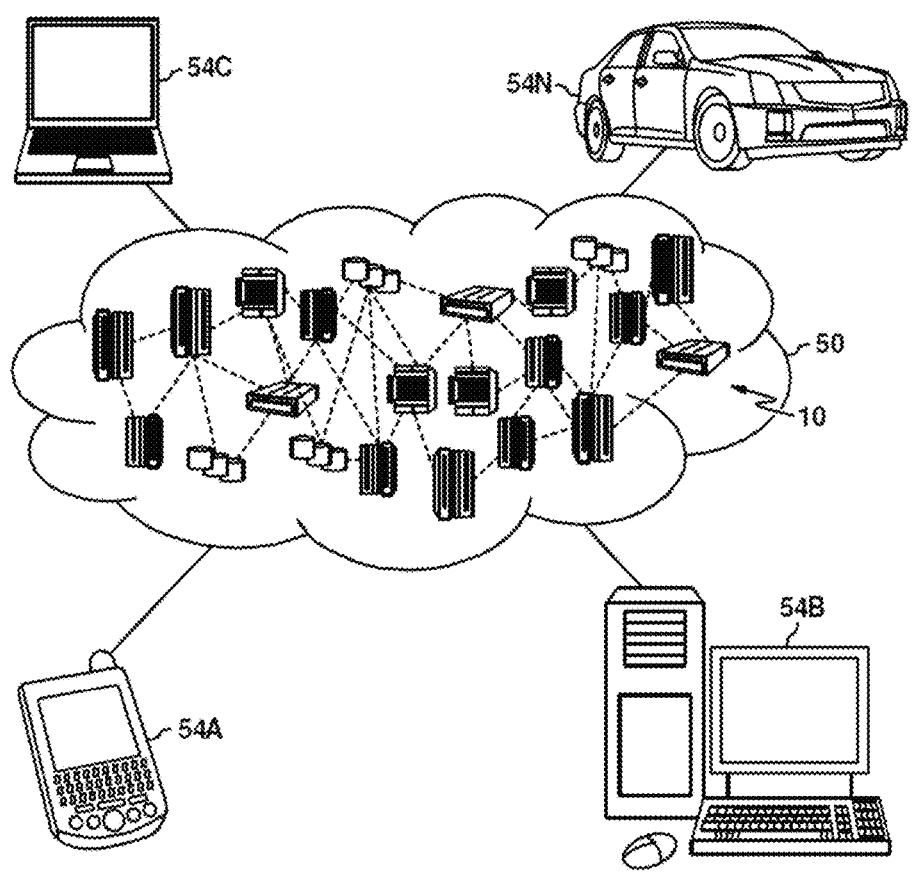
FIG. 3 illustrates a schematic view of an embodiment of a system for targeting geofence messages based on the transportation mode of a user operating in a cloud computing environment.

Referring to the drawings, FIG. 3 is illustrative of a network 120 operating as a cloud computing environment 50. As shown, the cloud computing environment 50 may include one or more cloud computing nodes 10 with which client computing devices used by cloud consumers, such as, for example, desktop computers 54b, laptop computers 54c, and mobile communication devices 54A, tablet computers or computer systems integrated into devices 54N as exemplified by the vehicle shown in FIG. 3.

Computer system nodes 10 may communicate with one another and may be grouped (not shown) physically or virtually, in one or more networks, such as Private, Community, Public, or Hybrid clouds as described hereinabove, or a combination thereof, allowing for the cloud computing environment 50 to offer infrastructure, platforms and/or software as services for which a cloud consumer does not need to maintain resources on a client device 101. It is understood that the types of client devices 101 as shown in FIG. 1 are intended to be illustrative only and that nodes 10 of a cloud computing environment can communicate with any type of computerized device over any type of network and/or network addressable connection (e.g., using a web browser).

Figure 4:
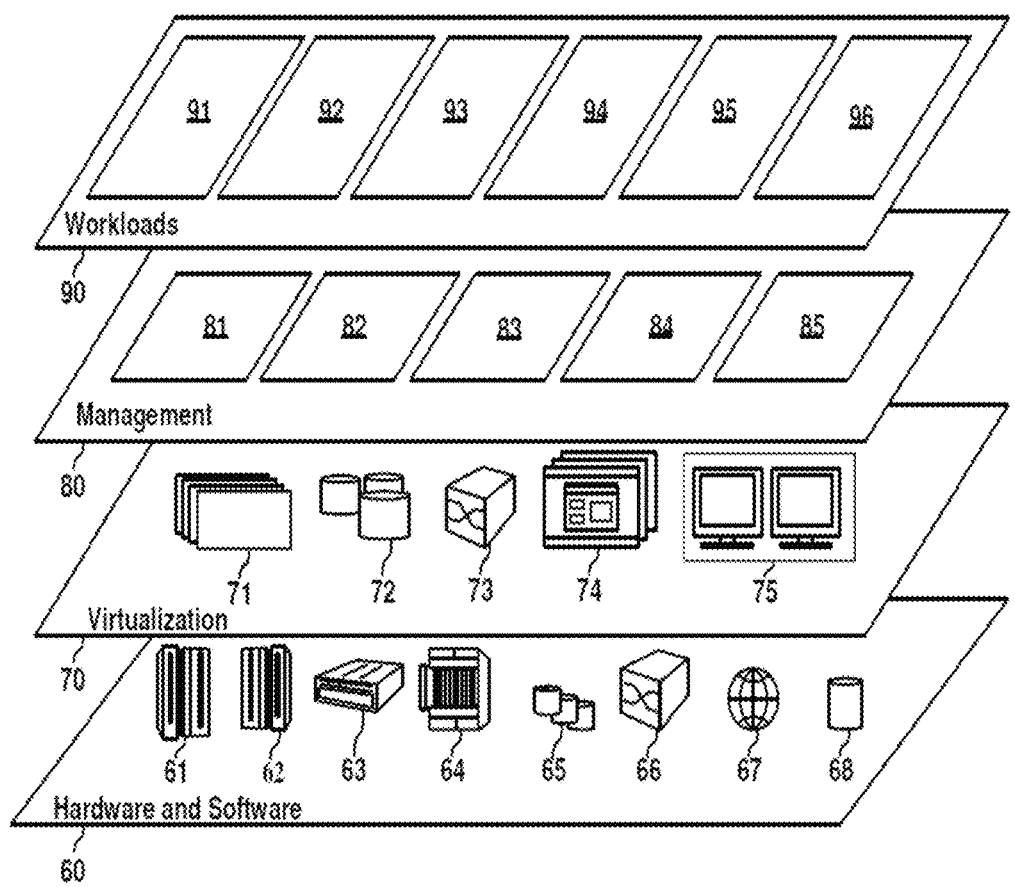
FIG. 4 illustrates a schematic view of an embodiment of the abstraction layers of a cloud computing environment.

Referring now to FIG. 4, a set of functional abstraction layers provided by a cloud computing environment 50 of the network 120 is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networking components 66. In some embodiments, software components may include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

Embodiments of the management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment 50 of the network 120 for consumers (i.e. geofence creators and users) and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment 50 may be utilized. Examples of workloads and functions which may be provided from this layer include: records management 91; web page management 92; searching and results management 93; data analytics processing 94; profile management 95; and geofence management 96.

Figure 2:
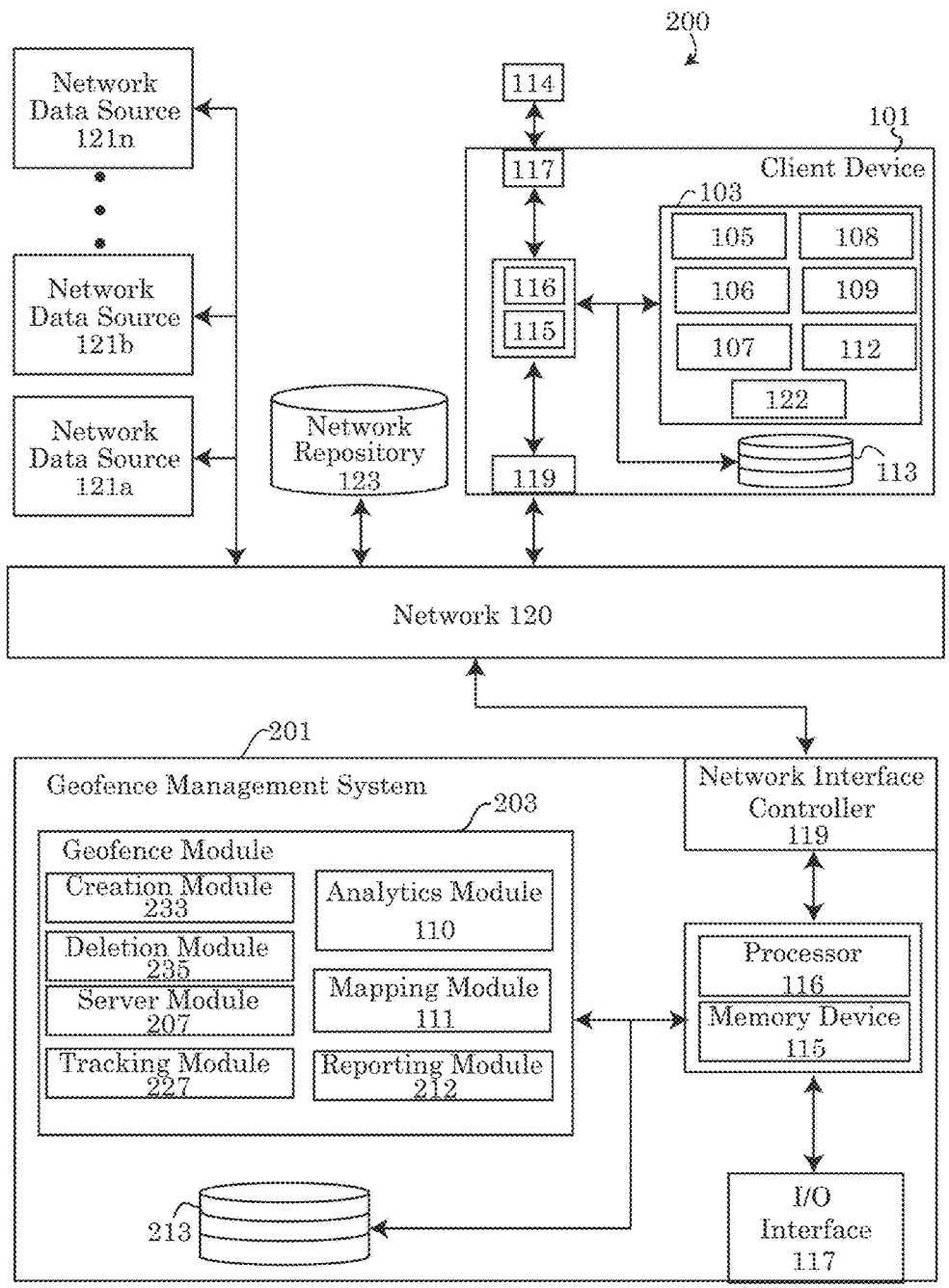
FIG. 2 depicts a schematic view of an alternative embodiment of a system for targeting geofence messages based on the transportation mode of a user consistent with the embodiments of the present disclosure.

In some embodiments of the geofence system 100, the system 100 may include one or more client devices 101 connected to a geofence management system 201 via the computer network 120 as shown in FIG. 1-2. A client device 101 may be any type of computing system that may be capable of moving or changing locations. Some examples of client devices 101 may include, but are not limited to mobile communication devices, smart phones, cell phones, laptops, tablet computers, smart watches and glasses, personalized data assistants (PDA) and wireless or internet enabled media devices. The client devices 101 may be any type of touch point device capable of acting as a point of interaction with the geofences created by the geofence management system 201 (described below). The client devices 101 are not limited only to the number of devices depicted in the figures of the current application, any number of client devices 101 may part of the geofence system 100 and connected to network 120. The number of client devices may be open ended.

Embodiments of the client devices 101 may include a geofence module 103 as shown in FIG. 1. The geofence module 103 may download and interact with active geofences created by the geofence management system 201. The geofence module 103 may be specialized hardware physically connected within the client device 101, a software program or program instructions loaded in the memory device 115 of the client device 101 or a separate hardware or software interacting with the client device 101. In alternative embodiments, the geofence module 103 providing access to each of the active geofences may be virtualized hardware that may be physically accessible via network 120 or remotely accessible via a program executing program instructions for transmitting, receiving and displaying the data of the geofences (and associated geofence messages). For example, the client device 101 may be accessing a virtualized geofence module 103 through program or application services maintained by a cloud computing network.

Embodiments of the computer systems 101, 201 may each include a geofence module 103, 203. The term "module" may refer to a hardware based module, software based module or a module may be a combination of hardware and software resources. A module (whether hardware, software, or a combination thereof) may be designed to implement or execute one or more particular functions, tasks or routines of the computer systems 101, 201. Embodiments of hardware based modules may include self-contained components such as chipsets, specialized circuitry and one or more memory devices. A software-based module may be part of a program code or linked to program code containing specific programmed instructions loaded in the memory device 115 of the specialized computer systems 101, 201 of the geofence system 100.

Embodiments of the geofence module 103 may include a location module 105. The location module 105 may be comprised of hardware and/or software capable of utilizing a positioning system to pinpoint the current location of the client device 101 and/or previously stored locations of the client device 101 that may be saved to the memory device 115 or database 113. The location module 105 may retrieve and store the location as location data. In some embodiments, the location module 105 may include a transmitter, receiver and/or transceiver for receiving location data from a positioning system or broadcasting the location data to a geofence management system 201. For example the location module 105 may utilize the positioning capabilities of the global positioning system (GPS) using a GPS antenna 106 in some embodiments. In alternative embodiments positioning systems may use Wi-Fi, Bluetooth or Bluetooth low energy beacons, cell tower triangulation or a combination of positional systems thereof. Embodiments of the location module 105 may save, store and update one or more sets of location data to a memory device 115 onboard the location module 105 or the location module 105 may store the location information to a separate memory device 115 or database 113.

Embodiments of the location module 105 may communicate the stored location data to the geofence management system 201 in order to allow the tracking module 227 to track the location of the client device 101, compare the location data with the established geofences, collect relevant data about the client device 101 or the device's user entering, exiting or dwelling within the established geofences and push one or more notifications to the client devices 101 triggering the transitioning conditions of the geofence using the mode of transportation designated by the geofence's parameters when the geofence was created.

Embodiments of the client device 101 may comprise additional hardware or software modules capable of identifying the mode of transportation the client device 101 is experiencing at the moment the client device 101 enters, exits or dwells within a geofence targeted toward a specific customer experiencing a particular mode of transportation. The components may be referred to as a measuring device or a sensor in some embodiments. Examples of some possible measuring devices and sensors are depicted in FIG. 1-2 of the geofence system 100, 200. The modules for measuring physical forces to identify the mode of transportation may include an accelerometer 107, gyro sensor 108 (a gyroscope sensor), or geomagnetic sensor 109 (collectively referred to as "measuring components 107, 108, 109"). Each of the measuring components 107, 108, 109 may be integrated into the client device 101 in some embodiments. In alternative embodiments, the measuring components 107, 108, 109 may be part of separate computing systems or device capable of obtaining measurements of physical forces associated with the measuring component. The measuring components 107, 108, 109 may interface with the client device 101 or transmit the measurement data to the client device 101 and/or geofence management system 201. In yet another alternative embodiment, the measuring components 107, 108, 109 may be a combination of modules integrated into the client device 101 and/or a third party device separate from the client device 101.

Each of the measuring components 107, 108, 109 may measure a physical force or a change in a force relevant to identifying a mode of transportation being utilized at the time the measurements are recorded. Use and analysis of the recorded measurements obtained by the measuring components 107, 108, 109 may assist with identifying a mode of transportation being experienced by the client device 101 as the client device 101 enters, exits or dwells within an active geofence. For example, an accelerometer 107 may be a device that may measure acceleration (i.e. a rate of change in velocity). As the client device 101 or separate third party device comprising the accelerometer 107 undergoes a change in velocity, the accelerometer 107 may measure the acceleration that the client device 101 is experiencing and record the measurement from the accelerometer 107.

The amount of acceleration being measured and stored as measurement data may be accessible to the analytics module 110 of the client device 101 or geofence management system 201, allowing for the analytics module 110 to draw conclusions about the current mode of transportation. For example, analytics module 110 of the client device 101 may have data models for the average walking velocity of a person (which may be approximately 3.1 miles per hour (mph)), whereas the average biking velocity may be between 9.6 to 25 mph and the average driving velocity may be much higher. The measurements collected by accelerometer 107 measuring a change in velocity that are much higher or beyond the amount of acceleration a human could manage walking or biking may indicate the use of a user riding or driving a vehicle, whereas a much smaller amount of acceleration consistent with human walking could indicate that a user is moving much slower than a vehicle such as the acceleration that may only be possible by a bike or automobile. The accelerations may be collected, recorded in a database 113 or network accessible repository 123 and further transmitted to the analytics module 110 for further analysis. Analyzing the measurements of the accelerometer 107 may result in the identification of the mode of transportation or at the very least be combined with additional measurement data, location data and lifestyle data to draw more accurate conclusions.

In some embodiments, one or more of the measuring components 107, 108, 109 may include a gyro sensor 108. A gyro sensor 108 may be a hardware device or software capable of sensing angular velocity, rotational motion and/or changes in orientation. Embodiments of a gyro sensor 108 may measure the amount of angular velocity being produced by a motion itself, and sense angular velocity produced by the movement of the sensor wherein angles may be detected by integration operations carried out by a processor 116 as angles move and are reflected in an application or by sensing vibrations produced by external environments around the gyro sensor 108 to correct the orientation of the object embedded with the gyro sensor 108 (i.e. the client device 101 or a third party device). For example, a user moving at a particular angular velocity while holding a client device 101 integrated with a gyro sensor 108 or a third party device comprising a gyro sensor 108, the angular velocity may be measured and compared with known angular velocities of different transportation modes, such as walking, bicycling, driving in an automobile, riding a train or riding in a plane.

Similar to the accelerometer 107 described above, the measurements recorded by the gyro sensor 108 may also be stored in a database 113, network accessible repository 123 or other data storage device. The measurements collected by the gyro sensor 108 may be transmitted to an analytics module 110 of either the client device 101 or geofence management system 201, wherein the measurements may be further analyzed alongside additional pieces of collected data, measurements and lifestyle data. The composite of all the data analyzed with the measurements of the gyro sensor 108 may result in the identification of the mode of transportation currently being experienced by the user of the client device 101.

In some embodiments of the client device 101, the geofence module 103 may comprise a geomagnetic sensor 109. Similar to the accelerometer 107 and the gyro sensor 108, the geomagnetic sensor 109 may also collect measurements of one or more physical forces experienced by the client device 101 or a by a separate third party device in communication with the client device 101, in order to identify the mode of transportation being experienced by the client device 101 at the time the client device 101 transitions (enters, exits or dwells) to an active geofence. A geomagnetic sensor 109 may determine an orientation of the client device 101 or a third party device in electronic communication with client device 101, based on the earth's magnetic field. A geomagnetic sensor 109 may enable accurate directional pointing for map orientation and navigation. When combined with an accelerometer 107 and a GPS antenna 106, the client device's 101 movements may be accurately tracked in real time and compared with the expected or simulated movement of a client device 101 of a user, currently being transported using various modes of transportation to identify the current mode of transportation be utilized.

Embodiments of the geofence module 103 of the client device 101 may, in some instances further comprise a lifestyle data collection module 122 that gathers lifestyle information/data regarding users. Embodiments of the lifestyle data collection module 122 may retrieve and store lifestyle data of the user from one or more network accessible data sources 121. The collected lifestyle data may be analyzed by the analytics module 110 to more accurately determine the mode of transportation currently being used by the user of the client device 101. The types of lifestyle data collected may vary depending on the network accessible data sources 121 that may be accessible to the client device 101. Examples of network accessible data sources 121 may include location history and travel patterns, calendar applications, social media, SMS, direct messaging, workout data from, for example, fitness monitoring devices such as fitness band similar Fitbit®, pedometer, voluntarily provided customer profile data, weather applications, device clock.

The lifestyle data collected by lifestyle data collection module 122 may provide additional clues and context to the types of transportation modes being used beyond the physical measurements that may be taken by the measuring components 107, 108, 109. For instance, the system 100 may be able to identify based on the lifestyle data how physically fit a user is, whether or not the user owns a vehicle and how far or often the user walks/rides a bike or drives. Moreover, additional contextual clues in the lifestyle data may also indicate the likelihood of a user walking, biking or driving. For example, the time of day and weather may indicate whether it's more or less likely for an individual to be walking or biking outside. For instance, if the client device 101 triggers a geofence late at night during a heavy thunderstorm or blizzard, it is much less likely that the user would be walking or bicycling as opposed to using a motorized vehicle. Conversely, during a relatively cool day during daylight and in view a relatively short distance to the geofence's location for the level of fitness demonstrated by the lifestyle data, the probability that the user is walking or bicycling may be considered relatively high and thus more likely to be running, walking or bicycling instead of using a motorized vehicle.

Embodiments of the geofence module 103 may further comprise an analytics module 110. The analytics module 110 may perform the function or task of analyzing location data collected by the location module 105, measurements collected by the measurement components 107, 108, 109 and/or the lifestyle data collected by the lifestyle collection module 122 from one or more network accessible data sources 121. Using the data collected from each source, the analytics module 110 may draw one or more conclusions from each source of collected data and determine, as a function of all the data available to the analytics module 110, the current mode of transportation being used by the user of the client device 101 at the time the client device 101 impinges on the border of the active geofence. The conclusions determined by analytics module 110 may be further stored in one or more databases 113, 213, network repositories 123, memory devices 115 or transmitted to the geofence management system 201. Based on the mode of transportation determined by the analytics module 110 as a function of each piece of data collected, a geofence message may be displayed on the display device 114 of the client device 101 if the mode of transportation selected by the geofence creator matches the transportation mode identified by the analytics module 110.

Figure 8:
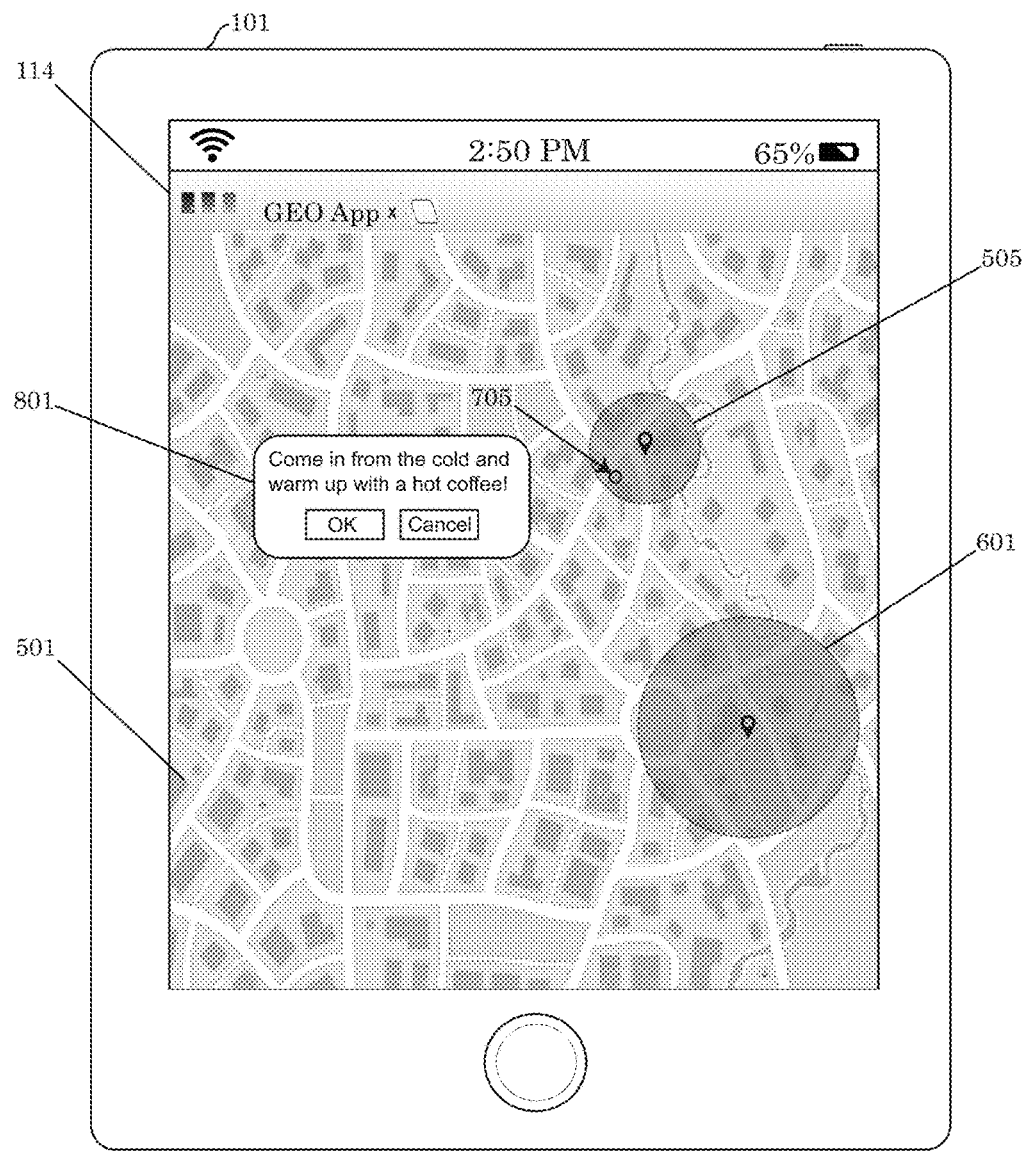
FIG. 8 illustrates an embodiment of a client device displaying a geofence message as a function of a client device entering a first geofence using a designated transportation mode.
Figure 11:
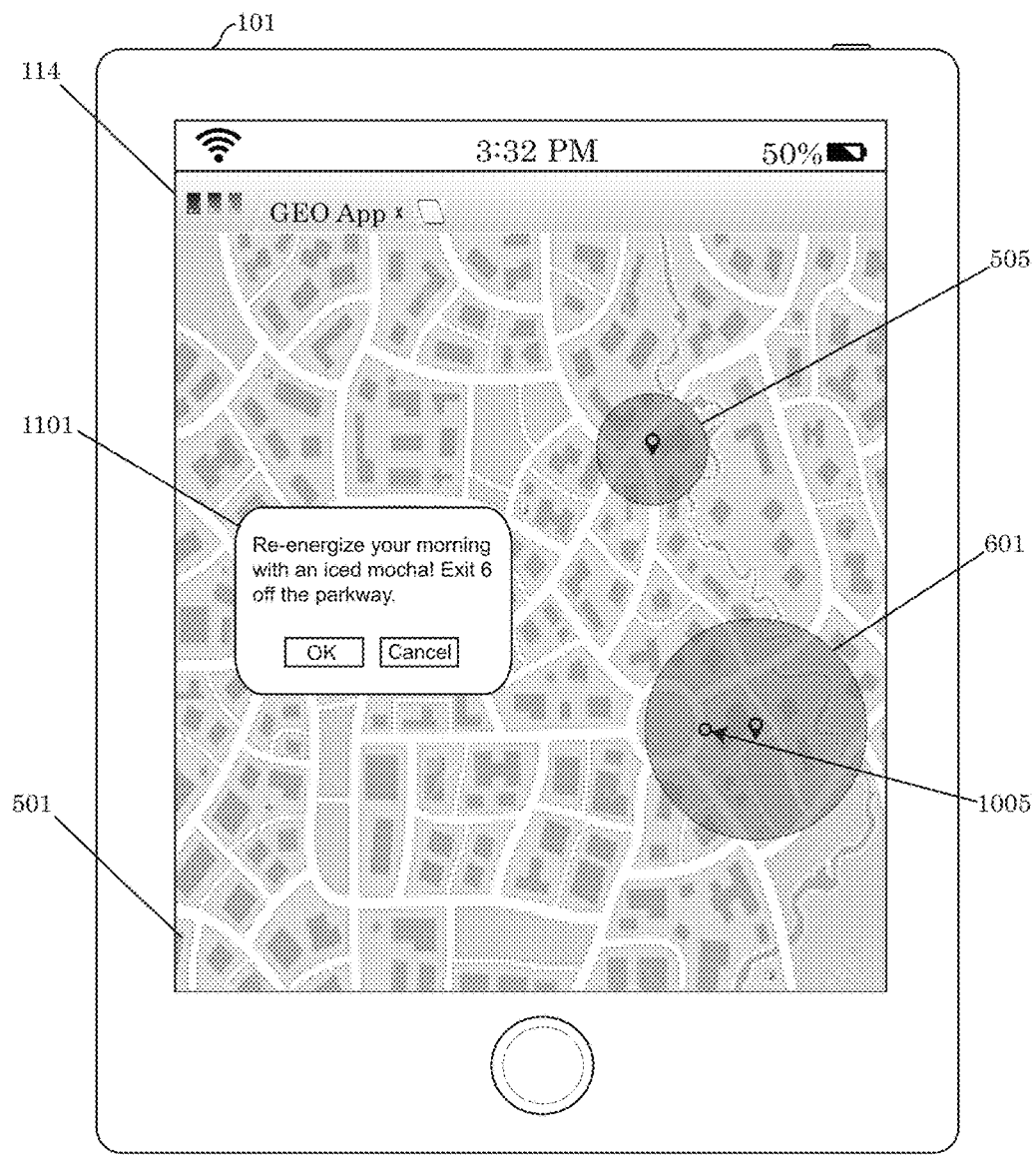
FIG. 11 depicts an alternative embodiment of a client device displaying a geofence message of a second geofence as a function of entering the second geofence using a designated mode of transportation.

In some embodiments of the client device 101, the client device may further comprise a mapping module 111. The mapping module 111 may perform the function of plotting the client device's 101 location and monitoring the changes in the position of the client device 101 in real time as the user of the client device 101 changes locations while transporting the client device 101. Embodiments of the mapping module 111 may receive the geofence data of activated geofences from the geofence management system 201. In some embodiments, the mapping module 111 may download or retrieve updated geofence data from the geofence server module 207. The client device's 101 mapping module 111 may plot each of active geofences as a function of the geofences' data onto a mapping interface 501. In some embodiments, the mapping interface 501 may or may not display the geofences' virtual barriers. Instead, the virtual barriers of the geofence may be hidden and may display a designated geofence message upon triggering a geofence loaded by the mapping module 111 onto a mapping interface 501, when a user's client device 101 enters the location of the geofence under the prescribed mode of transportation designated by the geofence's parameters. If the client device 101 enters the geofence under the prescribed mode of transportation set by the parameters of the geofence, the reporting module 112 of the geofence module 103 may display the geofence's message on the display device 114 of the client device 101. For example, as shown in FIGS. 8 and 11, the geofence message 801, 1101 may displayed as part of the mapping interface 501.

As mentioned above, in some embodiments of the geofence system 100, the geofence system 100 may include a geofence management system 201. The geofence management system 201 may perform the functions, tasks and services of system 100 directed toward creating, deleting, mapping and serving a geofence to a client device 101. The geofence management system 201 may be used to define the properties of the geofence including the geofence's location, size, message and mode of transportation of a user accessing the geofence for which the geofence messages may be targeted to. The geofence management system 201 may select configuration information of the geofence during each geofence setup, link the geofence to a specified mode of transportation, link a marketing campaign containing geofence message or individually customized geofence messages to the geofence, track the status of the transportation mode being used by one or more client device 101, and deliver geofence messages to the one or more client device 101 encountering the geofences under the selected transportation conditions.

Embodiments of the creation module 233 of the geofence management system 201 may perform the task of generating and configuring one or more geofences. The creation module 233 may allow a user or an administrator to input the desired configuration settings for each of the geofences being created. The creation module 233 may receive configuration settings being be inputted directly into the geofence management system 201 or from a remotely accessible computer system connected to the geofence management system 201 via network 120. For example, a request to build each of the geofences to a particular specification may be received by the geofence management system 201 in the form of an API call. The API call may be loaded into the memory device 115 of the geofence management system 201. The creation module 233 may analyze configuration settings of the geofence being created as requested by the geofence creator and the geofence management system 201 may confirm the settings are feasible or error free.

If the configuration settings for geofence are not feasible or contain errors, the geofence creation module 233 may deny the request and further request a correction of the errors. For example, the creator of the geofence may have forgotten to specify one or more modes of transportation. The geofence management system 201 may identify and report an error and request a correction to the configuration settings and parameters of the geofence. Otherwise, if the configuration settings are feasible and error free, the creation module 233 may build the geofence according to the requested parameters, including the requested duration, expiration date, start time, start date, end time, end date, location, size, virtual boundary shape, the applicable transitions for triggering the geofence, the notification messages of the geofence and the mode of transportation that may be permitted to activate the geofence's message.

Embodiments of the creation module 233 may save and store the created geofence parameters in a geofence management database 213 or a network accessible database such as a network repository 123, data mart or other data structure. Saving and storing each of the geofences and the configuration settings or parameters (including the geofence messages and mode of transportation) may, in some embodiments, allow for the geofence management system 201 to repeatedly create and activate the same geofences periodically. For example, a particular marketing event or special promotion may occur once a week, month, year, etc. A user of the geofence management system 201 may in some embodiments, query or lookup a previously created geofence stored in the geofence management database 213 and load the previously stored configuration settings and parameters into memory device 115 of the geofence management system 201, and update the database entry in the geofence management database 213 to include a newly scheduled starting date, duration and expiration date for the geofence.

Embodiments of the geofence module 203 may further comprise a server module 207. Embodiments of the server module 207 may perform the task of loading or transmitting one or more active geofences to one or more client devices 101. The server module 207 may transmit the geofences (created by the creation module 233) to one or more client devices 101 accessing the geofence management system 201 over the network 120. The client devices 101 connecting to the geofence management system 201 may retrieve, store, download or actively stream the geofence data of the geofences over network 120. The user of the client device 101 may select one or more geofences to download from a list of available geofences in some embodiments, while in alternative embodiments, geofences may be automatically downloaded or managed by the client device 101.

In some embodiments of the geofence system 100, the geofence module 203 may comprise a tracking module 227. The tracking module 227 may identify conditions giving rise to the triggering of a geofence message being displayed. As a client device 101 impinges on a virtual boundary of the geofences or dwells within the virtual boundaries of the geofences, the tracking module 227 may identify the triggering transition and elicit the transmission of the geofence message resulting from transition's occurrence, depending on whether the mode of transportation required by the geofence matches transportation mode being utilized by the user of the client device triggering the geofence.

Successfully triggering the geofence with the correct mode of transportation may cause the server module 207 to transmit the geofence's message to the client device 101. For example, the geofence message may be sent to the client device 101 using push notifications, emails, short messaging service (SMS) data or direct messaging service data. The geofence messages transmitted from the geofence server module 207 to the device's mapping module 111 may be triggered as a function of the tracking module 227 identifying a client device 101 triggering one or more active geofences while the client device is currently identified as travelling via a mode of transportation matching the geofence's mode of transportation parameter. Embodiments of the tracking module 227 may collect location data, measurements, lifestyle data and statistics of each of the geofences, the number of times the geofence is activated by client devices 101, the number of geofence messages served to the client devices 101 and transmit the collected data from the geofence management system 201 to the reporting module 212.

In some embodiments of the geofence management system 201, the reporting module 212 of the geofence management system 201 may perform the function of transmitting statistical information about the past or presently active geofences and the information collected by the geofence management system 201 during the activation of the geofence. For example, the reporting module 212 may be responsible for transmitting data collected by the tracking module 227. The reporting module 212 may transmit statistics and data that may assist the geofence system 100 or customers using the geofence system 100 with identifying the success or failure of the geofence's to target customers via mode of transportation. The report generated by the reporting module 212 may include the identification of the number of interactions users have with each of the geofences, an increase or decrease in the number transitions with the active geofences, demographic information about users interacting with each of the geofences, the attachment rate or rate at which geofence messages were positively or negatively received and/or acted upon by users of a client device 101. The reporting module 212 may further report the statuses of the geofences and whether or not each geofence is currently active, deactivated or deleted by the deletion module 235.

Embodiments of geofences system 100 may select a deletion date for deleting each geofence. Deletion of each geofence may be performed by the deletion module 235 and may occur at a scheduled date or in alternative embodiments, the deletion date may occur automatically at a pre-set time after a geofence's campaign has concluded.

Figure 5:
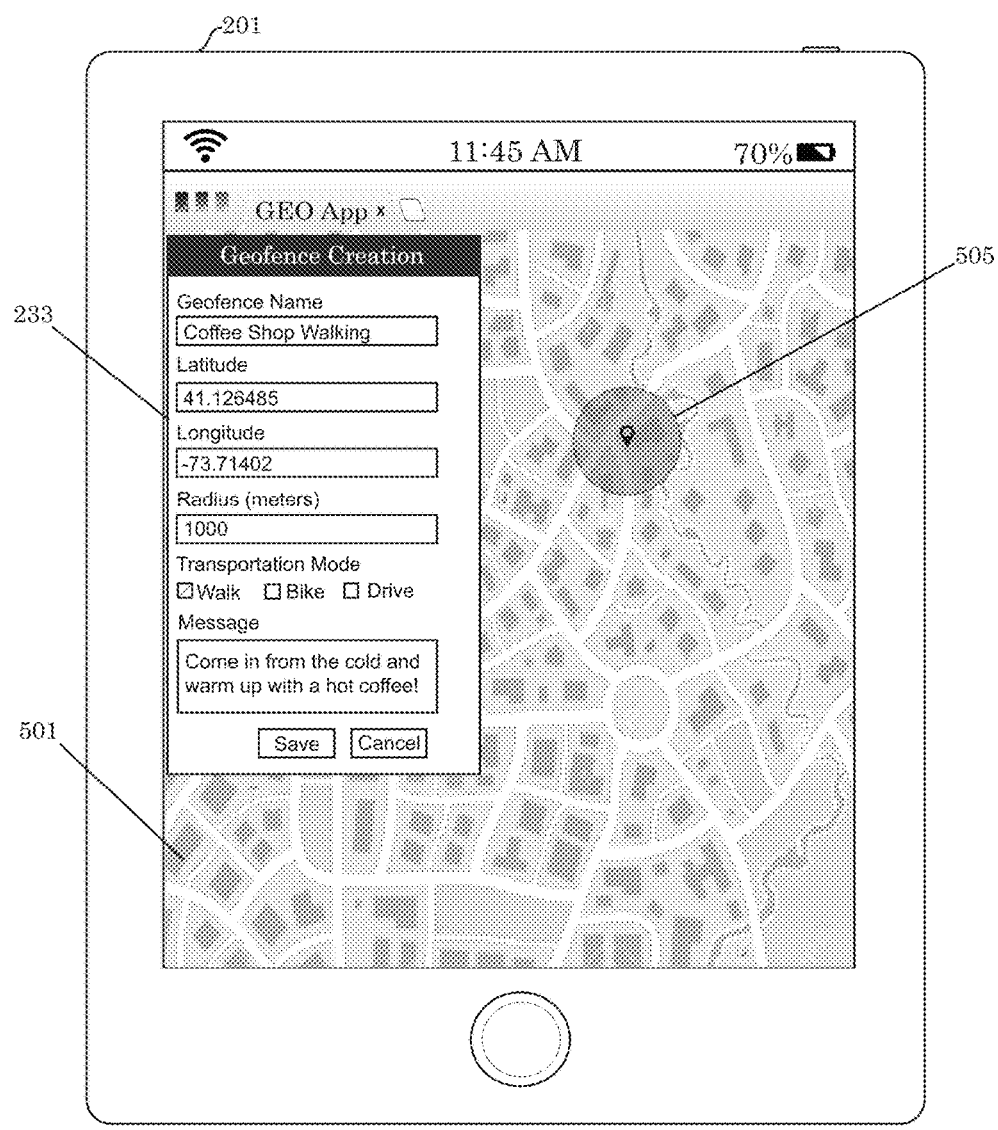
FIG. 5 illustrates an embodiment of a geofence management system creating a first geofence having a first set of defined parameters.

FIG. 5 depicts an example of the geofence creation process in accordance with the geofence management system 201 described above. As shown by the example in FIG. 5, a user of the geofence management system 201 may create a geofence 505 using the geofence creation module 233. During the creation process of the geofence 505, the user may select one or more parameters to define the geofence. As shown by the example, the user may identify the geofence by the name, enter a location (i.e. longitude and latitude of the geofence 505), a size of the geofence (i.e. radius, diameter, etc.) a transportation mode and a geofence message that may be displayed by display device 114 of the client device 101 if the client device 101 meets all the requirements for receiving the geofence message of the geofence 505, including entering, exiting or dwelling within the geofence 505 and upon triggering the boundary of the geofence 505 using the selected transportation mode.

Figure 6:
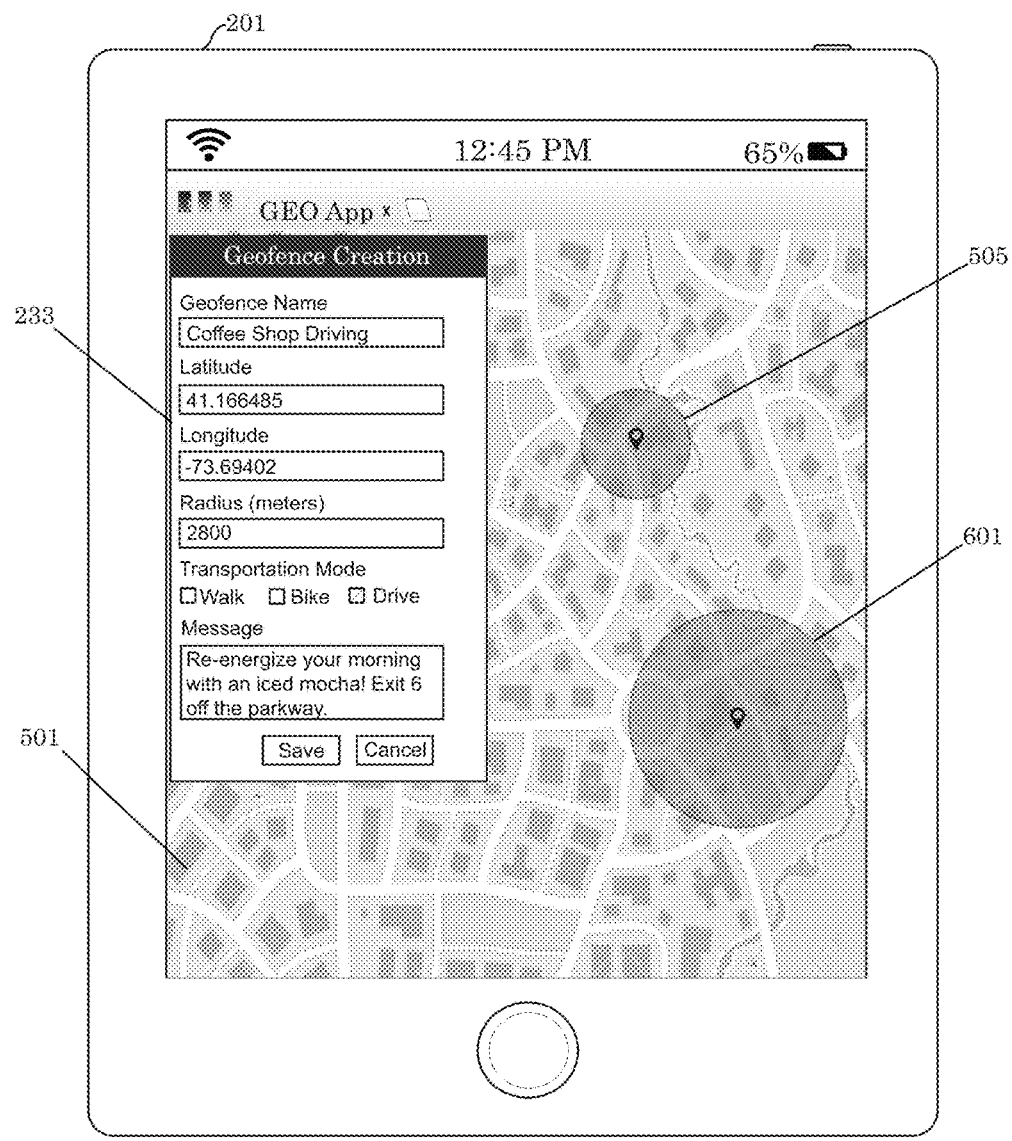
FIG. 6 illustrates an embodiment of a geofence management system creating a second geofence having a second set of defined parameters.

Each geofence created may be mapped to a mapping interface 501 generated by the mapping module 111. As shown in FIG. 6, a plurality of geofences 505, 601 may be created and plotted to a mapping interface 501 simultaneously. Each of the geofences 505, 601 may have different parameters, including different sizes, locations, messages and modes of transportation necessary to trigger the display of the geofence's message. As shown in FIG. 5-6, Geofence 505 has been created to display messages to user's that enter the geofence 505 by walking into the geofence, whereas geofence 601 has been configured to display a message to users driving through the geofence 601, instead of walking or biking.

Figure 7:
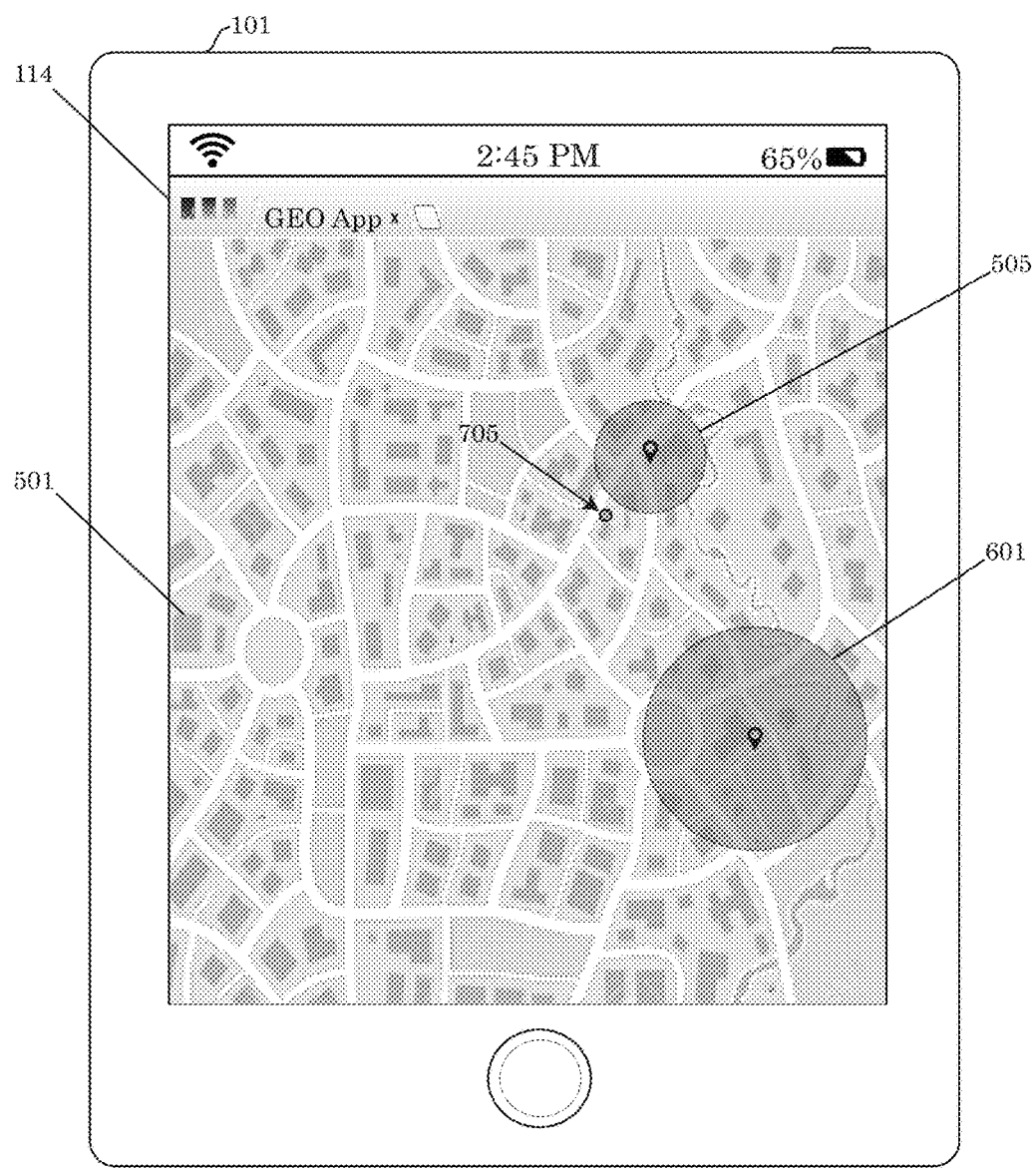
FIG. 7 illustrates an embodiment of a client device displaying a mapping interface tracking locations of the client device relative to one or more geofences.
Figure 9:
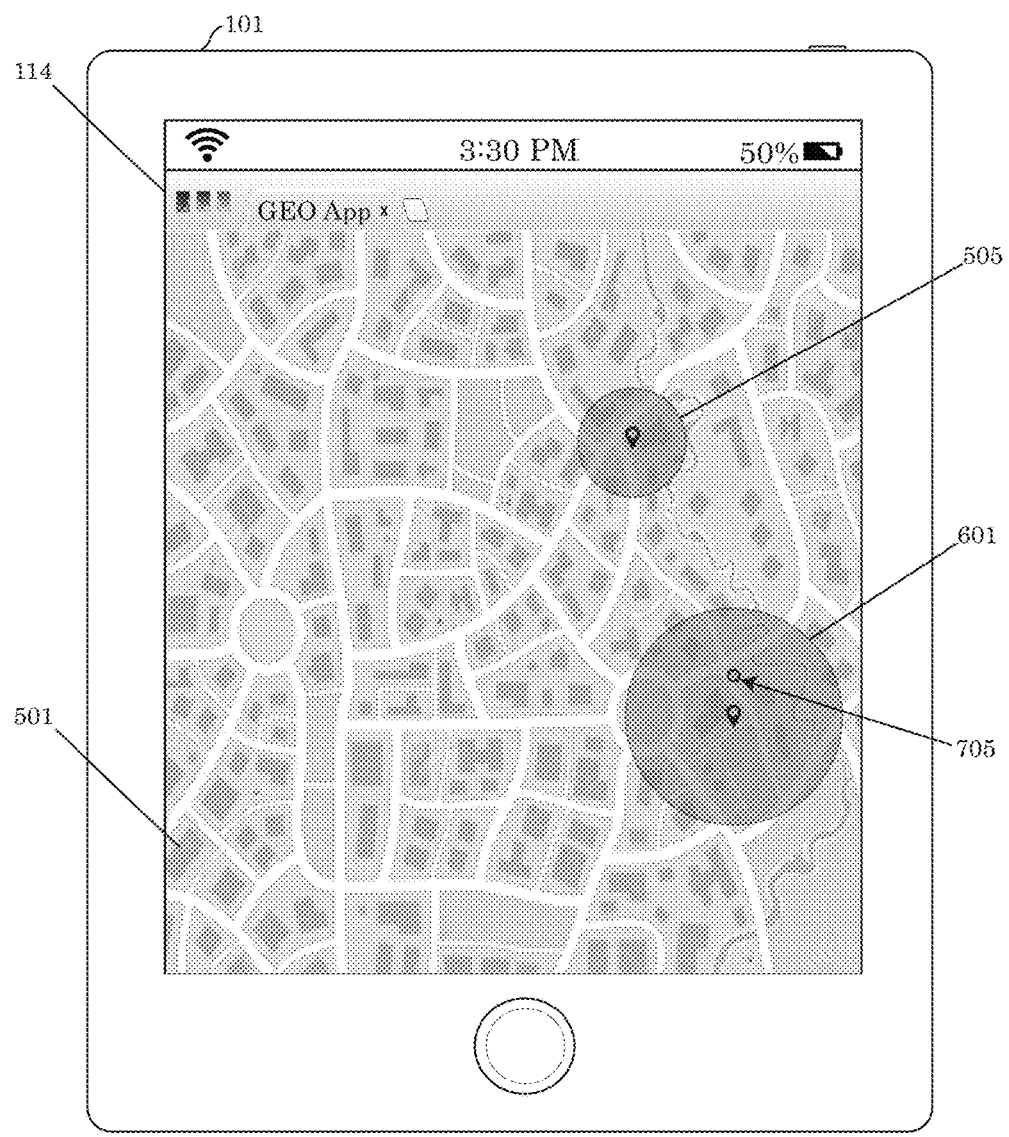
FIG. 9 depicts an embodiment of a client device failing to display a geofence message as a function of entering a second geofence without using a designated transportation mode.
Figure 10:
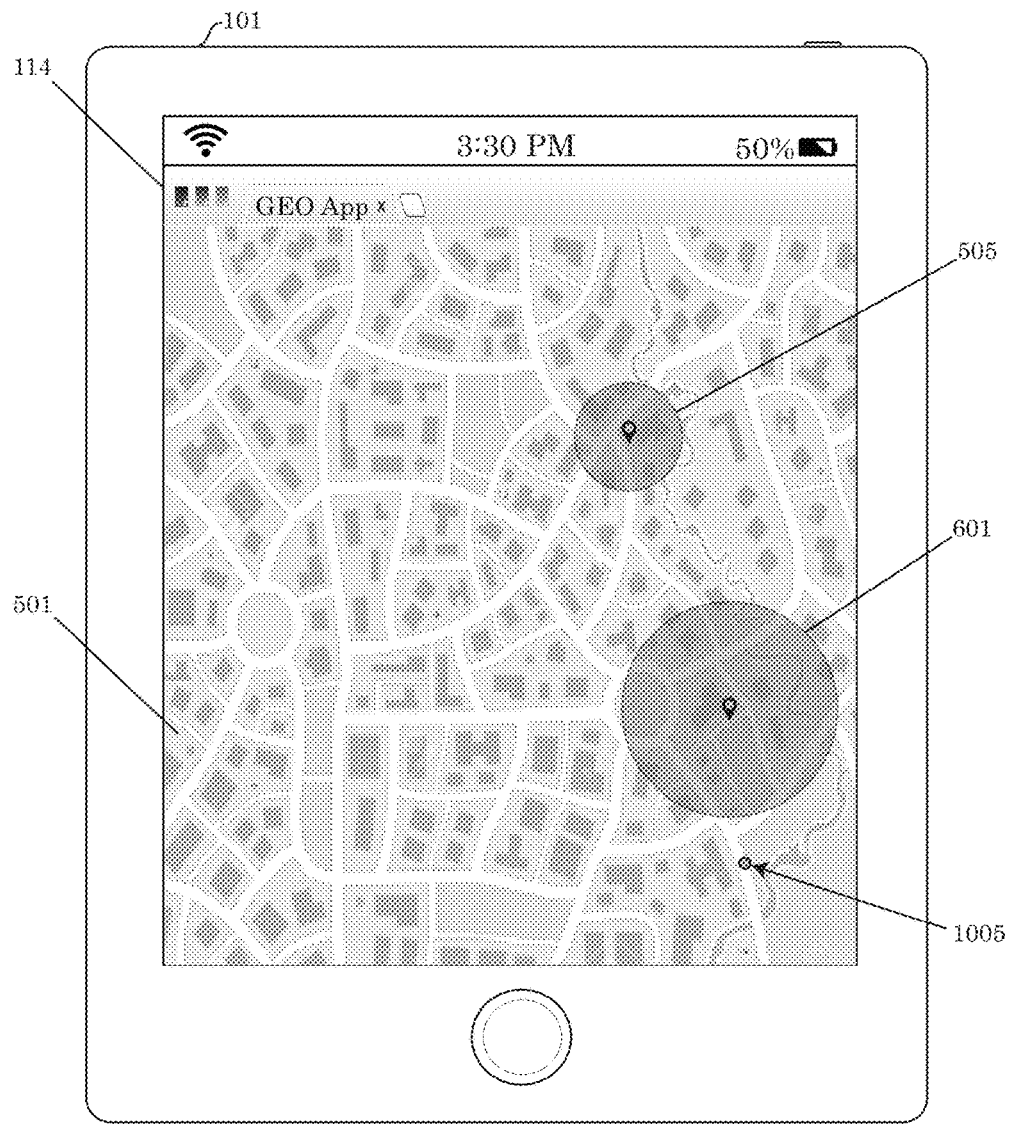
FIG. 10 depicts an alternative embodiment of a client device tracking a location of the client device relative to one or more established geofences created by a geofence management system.

As shown in FIG. 7-8, a user operating a client device 101 having a location 705 outside of the geofence 505 using a walking mode of transportation will not trigger the message to display while the user's location 705 is outside of the geofence's boundary as shown in FIG. 7. However, once the location 705 of the user changes to be within the boundary of the geofence 505 while walking, the geofence may display a geofence message 801, corresponding to geofence 505, onto the display device 114 of the client device 101 operated by the user. As shown in FIG. 9, the user operating the client device experiencing a walking mode of transportation will not trigger a geofence message 1101 corresponding to geofence 601 when the user's location 705 is within the boundaries of geofence 601. This is due to the mode of transportation (driving) set during the creation process not matching the mode of transportation being utilized by user (walking) transitioning into the geofence 601.

Figure 12:
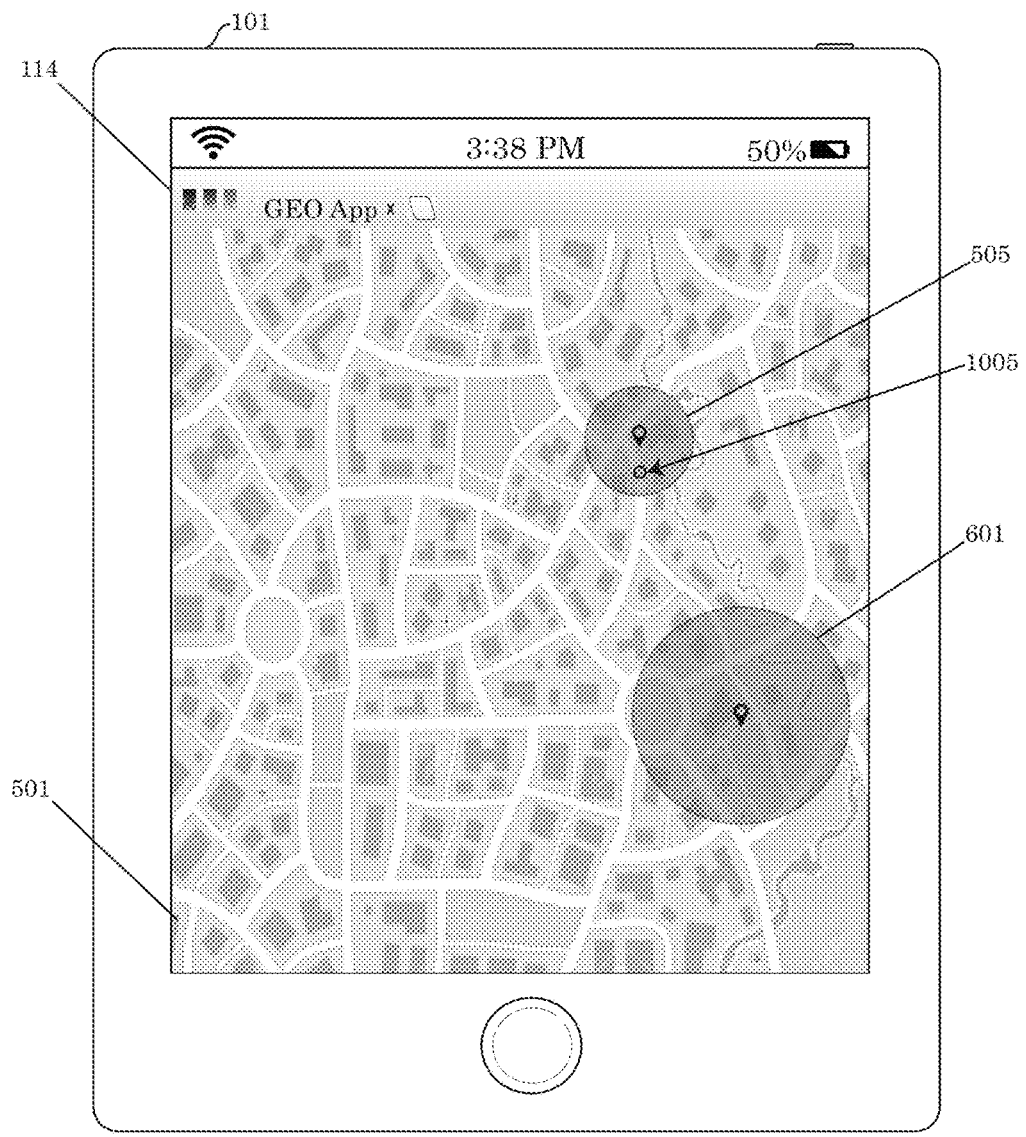
FIG. 12 depicts an alternative embodiment of a client device failing to display a geofence message of a first geofence as a function of entering the first geofence using an undesignated mode of transportation.

As opposed to the user described by FIGS. 7-9, at the same or different user travelling using a driving mode of transportation may trigger the display of the geofence message 1101 as the user's location 1005 enters the boundary of the geofence 601 using the mode of transportation matching the mode set by the geofence management system 201 during the creation process shown in FIG. 6. Likewise, as shown in FIG. 12, the user having a location 1005 driving through the geofence 505 does not illicit the display of message 801 due to difference in the mode of transportation set by the geofence management system 201 as shown in FIG. 5. However, in some instances a user may change a mode of transportation while within the geofence. For example, the user may park the vehicle the user was driving while entering the geofence 505 as shown in FIG. 12. However, the analytics module 110 of the client device 101 may further detect that the transportation mode has changed from driving to walking, based on the changes to the measurements collected by the measuring components 107, 108, 109. Accordingly, while the user is walking within the geofence 505, the geofence message 801 may be displayed because the user has changed to a mode of transportation that matches the mode of transportation prescribed by the parameters of the geofence 505 while the user's location 1005 is within the boundary of the geofence 505.

Method for Activating a Geofence Based on Mode of Transportation

Figure 13:
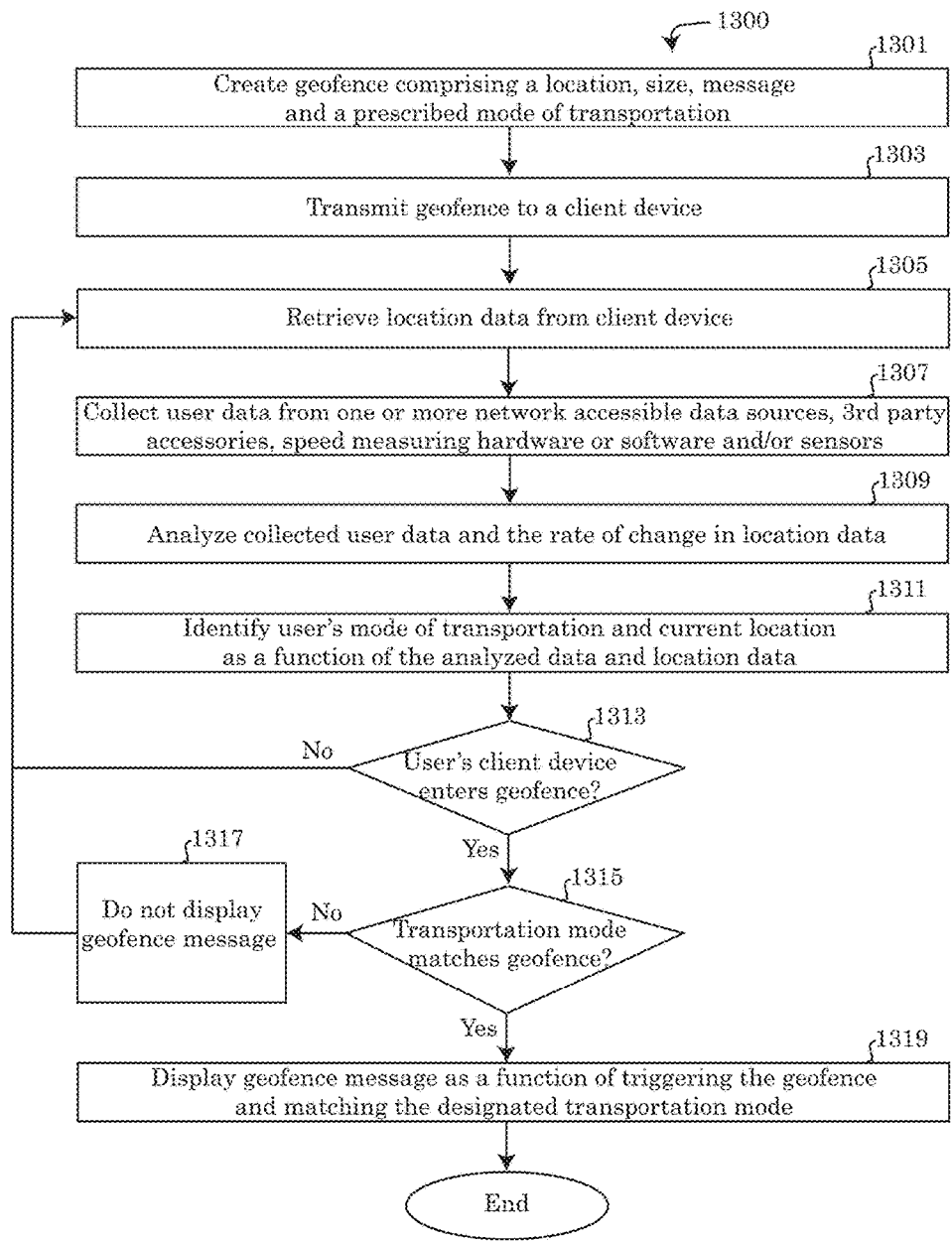
FIG. 13 depicts an embodiment of an algorithmic method for targeting geofence campaign messages based on the transportation mode of a user.

The drawing of FIG. 13 represents an embodiment of a method or algorithm 1300 that may be implemented for targeting geofence messages based on a transportation mode of a user in accordance with the geofence system 100, 200 described in FIGS. 1-12, using one or more computer systems as defined generically in FIG. 14 below, and more specifically by the embodiments of specialized computer systems 101, 201 presented in FIGS. 1-12. A person skilled in the art should recognize that the steps of the algorithm 1300 described in FIG. 13 may be performed in a different order than presented by FIG. 13 and the algorithm 1300 may not require all the steps described herein to be performed.

The embodiment of the algorithm 1300 for targeting geofence messages based on a transportation mode of a user may begin at step 1301. In step 1301, a geofence may be created by the creation module 233 comprising a location, size message and prescribed mode(s) of transportation which may be selected during the creation process or subsequently amended by the geofence creator or administrator at a later point in time. The created geofence may be saved and stored to a computer storage device such as memory device 115 of the geofence management system 201, a database 213 or a network accessible repository 123.

In step 1303 the geofence created in step 1301 may be transmitted and saved to a client device 101 via the server module 207. Each client device 101 storing an active geofence created by the geofence management system 201 may have the client device's 101 location tracked by the tracking module 227 which may determine whether or not the location of the client device 101 is within the virtual boundaries of the active geofence downloaded, stored or streamed to the client device 101 via server module 207. In step 1305, the tracking module 227 of the geofence management system 201 may continuously retrieve location data collected and stored by the location module 105 of the client device 101 in order to track the location of the client device 101 relative to the location of the geofence created in step 1301.

In step 1307, the client device 101 and/or the geofence management system 201 may collect user data in the form of lifestyle data from one or more network accessible data sources 121, measurement data from one or more $3^{rd}$ party accessories in electronic communication with client device 101, and any measurements from measuring components 107, 108, 109 capable of acting as a measuring device or sensor. In step 1309, the collected user data from all network accessible data sources 121, devices and sensors may be analyzed by an analytics module 110. Embodiments of the analysis step 1309 may be performed by different computer systems depending on whether the determination of the transportation mode of the client device 101 is performed client side by the client device 101 (as shown in system 100) or server side by the geofence management system 201 (as shown in system 200). The analytics module 110 may, in strep 1311, based on all of the collected user data, identify the transportation mode of the client device 101 or at the very least identify the most likely transportation mode being utilized by a user of the client device 101. The identification of the mode of transportation mode may be made as a function of the location data, lifestyle data and measurement data collected by the measurement components 107, 109, 109.

In step 1313, a determination may be made by the tracking module 227 whether or not the client device 101 has entered the boundary of the geofence created in step 1301. This step may be performed by comparing the location data received by the location module 105 with the geofence location data inputted into the creation module 233. If, the location data of the client device 101 is not determined to be within the boundaries of the geofence, the algorithm 1300 may proceed back to step 1305 and continue to retrieve location data from the client device 101. If, however, in step 1313 the tracking module 227 determines that the location of the client device 101 is within the designated boundaries of the geofence, the algorithm 1300 may proceed to step 1315.

In step 1315, an additional determination may be made to ensure that the client device 101 within the boundary of the geofence is currently moving using a mode of transportation prescribed by the geofence. If, in step 1315, the client device 101 has been identified in step 1311 as not moving at a prescribed mode of transportation, algorithm 1300 may proceed to step 1317, wherein the geofence management system 201 does not display a geofence message on the display device 114 of the client device 101. Conversely, if in step 1315, the algorithm 1300 determines that the transportation mode identified by the system in step 1311 matches one of the transportation modes prescribed by the geofence, algorithm 1300 may proceed to step 1319 and display a prescribed geofence message, similar to geofence messages 801, 1101 on the display device 114 of the client device 101 as a function of triggering the geofence and matching the designated transportation mode.

Computer System

Referring to the drawings, FIG. 14 illustrates a block diagram of a computer system 1400 that may be included in the systems of FIGS. 1-12 and for implementing methods for targeting geofence campaign messages based on the transportation mode of a user as described in the algorithms of FIG. 13 and in accordance with the embodiments described in the present disclosure. The computer system 1400 may generally comprise a processor 1491, otherwise referred to as a central processing unit (CPU), an input device 1492 coupled to the processor 1491, an output device 1493 coupled to the processor 1491, and memory devices 1494 and 1495 each coupled to the processor 1491. The input device 1492, output device 1493 and memory devices 1494, 1495 may each be coupled to the processor 1491 via a bus 1490. Processor 1491 may perform computations and control the functions of computer 1400, including executing instructions included in the computer code 1497 for tools and programs for targeting geofence campaign messages based on the transportation mode of a user, in the manner prescribed by the embodiments of the disclosure using the systems of FIGS. 1-12 wherein the instructions of the computer code 1497 may be executed by processor 1491 via memory device 1495. The computer code 1497 may include software or program instructions that may implement one or more algorithms for implementing the methods for targeting geofence campaign messages based on the transportation mode of a user, as described in detail above and in FIG. 13. The processor 1491 executes the computer code 1497. Processor 1491 may include a single processing unit, or may be distributed across one or more processing units in one or more locations (e.g., on a client and server).

The memory device 1494 may include input data 1496. The input data 1496 includes any inputs required by the computer code 1497, 1498. The output device 1493 displays output from the computer code 1497, 1498. Either or both memory devices 1494 and 1495 may be used as a computer usable storage medium (or program storage device) having a computer readable program embodied therein and/or having other data stored therein, wherein the computer readable program comprises the computer code 1497, 1498. Generally, a computer program product (or, alternatively, an article of manufacture) of the computer system 1400 may comprise said computer usable storage medium (or said program storage device).

Memory devices 1494, 1495 include any known computer readable storage medium, including those described in detail below. In one embodiment, cache memory elements of memory devices 1494, 1495 may provide temporary storage of at least some program code (e.g., computer code 1497, 1498) in order to reduce the number of times code must be retrieved from bulk storage while instructions of the computer code 1497, 1498 are executed. Moreover, similar to processor 1491, memory devices 1494, 1495 may reside at a single physical location, including one or more types of data storage, or be distributed across a plurality of physical systems in various forms. Further, memory devices 1494, 1495 can include data distributed across, for example, a local area network (LAN) or a wide area network (WAN). Further, memory devices 1494, 1495 may include an operating system (not shown) and may include other systems not shown in the figures.

In some embodiments, rather than being stored and accessed from a hard drive, optical disc or other writeable, rewriteable, or removable hardware memory device 1494, 1495, stored computer program code 1498 (e.g., including algorithms) may be stored on a static, non-removable, read-only storage medium such as a Read-Only Memory (ROM) device 1499, or may be accessed by processor 1491 directly from such a static, non-removable, read-only medium 1499. Similarly, in some embodiments, stored computer program code 1497 may be stored as computer-readable firmware 1499, or may be accessed by processor 1491 directly from such firmware 1499, rather than from a more dynamic or removable hardware data-storage device 1495, such as a hard drive or optical disc.

In some embodiments, the computer system 1400 may further be coupled to an input/output (I/O) interface (for example I/O interface 117) and a computer data storage unit (for example a data store, data mart or repository 113, 123). An I/O interface 117 may include any system for exchanging information to or from an input device 1492 or output device 1493. The input device 1492 may be, inter alia, a keyboard, joystick, trackball, touchpad, scanning device, bar code reader, mouse, sensors, beacons, RFID tags, microphones, recording device, biometric input device, camera, timer, etc. The output device 1493 may be, inter alia, a printer, a plotter, a display device 114 (such as a computer screen or monitor), a magnetic tape, a removable hard disk, a floppy disk, etc. The memory devices 1494 and 1495 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus 1490 may provide a communication link between each of the components in computer 1400, and may include any type of transmission link, including electrical, optical, wireless, etc.

The I/O interface may allow computer system 1400 to store information (e.g., data or program instructions such as program code 1497, 1498) on and retrieve the information from a computer data storage unit (not shown). Computer data storage units include any known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk).

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider able to deploy or integrate computing infrastructure with respect to targeting geofence campaign messages based on the transportation mode of a user. Thus, an embodiment of the present invention discloses a process for supporting computer infrastructure, where the process includes providing at least one support service for at least one of integrating, hosting, maintaining and deploying computer-readable code (e.g., program code 1497, 1498) in a computer system (e.g., computer 1400) including one or more processor(s) 1491, wherein the processor(s) carry out instructions contained in the computer code 1497 causing the computer system to target geofence campaign messages based on the transportation mode of a user. Another embodiment discloses a process for supporting computer infrastructure, where the process includes integrating computer-readable program code into a computer system including a processor.

The process of integrating includes storing the program code in a computer-readable storage device of the computer system through use of the processor. The program code, upon being executed by the processor, implements a method for targeting geofence campaign messages based on the transportation mode of a user. Thus the present invention discloses a process for supporting, deploying and/or integrating computer infrastructure, integrating, hosting, maintaining, and deploying computer-readable code into the computer system 1400, wherein the code in combination with the computer system 1400 is capable of implementing methods for targeting geofence campaign messages based on the transportation mode of a user.

A computer program product of the present invention comprises one or more computer readable hardware storage devices having computer readable program code stored therein, said program code containing instructions executable by one or more processors of a computer system to implement the methods of the present invention.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for targeting geofence messages based on a transportation mode of a user comprising the steps of:

creating, by a processor of a computer system, a geofence, wherein the geofence comprises a location, a size, a message, and a mode of transportation parameter;

receiving, by the processor, location data of a client device operated by the user;

further receiving, by the processor, measurements from a measuring device or a sensor quantifying movement of the client device, wherein the measuring device or sensor comprises an accelerometer, a gyroscope sensor, and a geomagnetic field sensor;

detecting, by said processor based on said measurements, a velocity and acceleration rate of said user;

detecting, by said processor via said gyroscope sensor, an angular velocity, a rotational motion, and a change of orientation of said user, wherein said detecting said angular velocity comprises measuring an amount of angular velocity being produced by a motion of said user and sensing an angular velocity produced by movement of the gyroscope sensor, and wherein associated angles are detected by said processor as said angles move and by sensing vibrations produced by external environments surrounding said gyroscope sensor to correct an orientation of an object embedded with said gyroscope sensor;

analyzing, by the processor, said angular velocity, said rotational motion, and said change of orientation of said user, said velocity and acceleration rate, a rate of change in the location data and the measurements from the measuring device or sensor thereby identifying the transportation mode as a function of the location data and measurements, wherein said identifying said transportation mode comprises comparing said angular velocity produced by movement of the gyroscope sensor to known angular velocities associated with walking, biking, driving in an automobile, riding a train, and riding on an airplane;

concluding, by the processor, that a location of the client device is within the location of the geofence and that the transportation mode of the user operating the client device is the same as the mode of transportation parameter defined by the geofence as a function of the measurements and location data; and displaying, by the processor, the message on the client device.

2. The method of claim 1, wherein the measuring device or sensor is integrated into the client device.

3. The method of claim 1, wherein the measuring device or sensor is a hardware device separate from the client device of the user.

4. The method of claim 1, further comprising the step of:
receiving, by the processor, lifestyle information about the user from one or more data sources;
further analyzing the location data and measurements of the measuring device or sensor in view of the lifestyle information to identify the transportation mode of the user.

5. The method of claim 4, wherein one or more data sources providing the lifestyle information are selected from the group consisting of social media, calendar applications, workout data, travel patterns, weather, and time of day.

6. The method of claim 1, further comprising providing at least one support service for at least one of creating, integrating, hosting, maintaining, and deploying computer-readable program code in a computer system, where the computer-readable program code in combination with the computer system is configured to implement the steps of creating, receiving, further receiving, analyzing, identifying and displaying.

7. A computer system, comprising:
a processing unit;
a memory device coupled to the processing unit;
a measuring device or sensor; and
a computer readable storage device coupled to the processor, wherein the storage device contains program code executable by the processing unit via the memory device to implement a method for targeting a geofence messages based on a transportation mode of a user comprising the steps of:
creating, by the processing unit, a geofence, wherein the geofence comprises a location, a size, a message, and a mode of transportation parameter;
receiving, by the processing unit, location data of a client device;
further receiving, by the processor, measurements from a measuring device or a sensor quantifying movement of the client device, wherein the measuring device or sensor comprises an accelerometer, a gyroscope sensor, and a geomagnetic field sensor;

detecting, by said processor based on said measurements, a velocity and acceleration rate of said user;

detecting, by said processor via said gyroscope sensor, an angular velocity, a rotational motion, and a change of orientation of said user, wherein said detecting said angular velocity comprises measuring an amount of angular velocity being produced by a motion of said user and sensing an angular velocity produced by movement of the gyroscope sensor, and wherein associated angles are detected by said processor as said angles move and by sensing vibrations produced by external environments surrounding said gyroscope sensor to correct an orientation of an object embedded with said gyroscope sensor;

analyzing, by the processor, said angular velocity, said rotational motion, and said change of orientation of said user, said velocity and acceleration rate, a rate of change in the location data, and the measurements from the measuring device or sensor thereby identifying the transportation mode as a function of the location data and measurements, wherein said identifying said transportation mode comprises comparing said angular velocity produced by movement of the gyroscope sensor to known angular velocities associated with walking, biking, driving in an automobile, riding a train, and riding on an airplane;

concluding, by the processor, that a location of the client device is within the location of the geofence and that the transportation mode of the user operating the client device is the same as the mode of transportation parameter defined by the geofence as a function of the measurements and location data; and displaying, by the processor, the message on the client device.

8. The system of claim 7, wherein the measuring device or sensor is integrated into the client device of the user.

9. The system of claim 7, wherein the measuring device or sensor is a hardware device separate from the client device of the user.

10. The system of claim 7, further comprising the step of:
receiving, by the processor, lifestyle information about the user from one or more data sources;
further analyzing the location data and measurements of the measuring device or sensor in view of the lifestyle information to identify the transportation mode of the user.

11. A computer program product comprising:
one or more computer readable hardware storage devices having computer readable program code stored therein, said program code containing instructions executable by the one or more central processing units (CPU) to implement a method for targeting geofence messages to a based on a transportation mode of a user comprising the steps of:
creating, by the CPU, a geofence, wherein the geofence comprises a location, a size, a message, and a mode of transportation parameter;
receiving, by the CPU, location data of a client device;
further receiving, by the CPU, measurements from a measuring device or a sensor quantifying movement of the client device, wherein the measuring device or sensor comprises an accelerometer, a gyroscope sensor, and a geomagnetic field sensor;
detecting, by the CPU based on said measurements, a velocity and acceleration rate of said user;

detecting, by the CPU via said gyroscope sensor, an angular velocity, a rotational motion, and a change of orientation of said user, wherein said detecting said angular velocity comprises measuring an amount of angular velocity being produced by a motion of said user and sensing an angular velocity produced by movement of the gyroscope sensor, and wherein associated angles are detected by said processor as said angles move and by sensing vibrations produced by external environments surrounding said gyroscope sensor to correct an orientation of an object embedded with said gyroscope sensor;

analyzing, by the CPU, said angular velocity, said rotational motion, and said change of orientation of said user, said velocity and acceleration rate, a rate of change in the location data, and the measurements from the measuring device or sensor to thereby identifying the transportation mode as a function of the location data and measurements, wherein said identifying said transportation mode comprises comparing said angular velocity produced by movement of the gyroscope sensor to known angular velocities associated with walking, biking, driving in an automobile, riding a train, and riding on an airplane;

concluding, by the CPU, that a location of the client device is within the location of the geofence and that the transportation mode of the user operating the client device is the same as the mode of transportation parameter defined by the geofence as a function of the measurements and location data; and displaying, by the CPU, the message on the client device.

12. The computer program product of claim 11, wherein the measuring device or sensor is integrated into the client device of the user.

13. The computer program product of claim 11, wherein the measuring device or sensor is a hardware device separate from the client device of the user.

14. The computer program product of claim 11, further comprising the steps of:

receiving, by the processor, lifestyle information about the user from one or more data sources;

further analyzing the location data and measurements of the measuring device or sensor in view of the lifestyle information to identify the transportation mode of the user.

* * * * *